United States Patent
Rumph

(12) United States Patent (10) Patent No.: US 7,020,657 B2
Rumph (45) Date of Patent: *Mar. 28, 2006

(54) SCALABLE HARDWARE SCHEDULER TIME BASED CALENDAR SEARCH ALGORITHM

(75) Inventor: Darryl J. Rumph, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 416 days.

This patent is subject to a terminal disclaimer.

(21) Appl. No.: 10/242,151

(22) Filed: Sep. 12, 2002

(65) Prior Publication Data

US 2003/0058879 A1    Mar. 27, 2003

Related U.S. Application Data

(60) Provisional application No. 60/325,500, filed on Sep. 27, 2001.

(51) Int. Cl.
G06F 17/30 (2006.01)

(52) U.S. Cl. .............. 707/101; 707/3; 707/7; 707/102; 707/103; 707/104.1

(58) Field of Classification Search ............ 707/1, 707/3, 7, 9, 101, 6, 10, 102, 103, 104.1; 711/216; 370/60.1, 234, 412
See application file for complete search history.

(56) References Cited

U.S. PATENT DOCUMENTS

| 5,497,485 | A | * | 3/1996 | Ferguson et al. ............ 707/1 |
|---|---|---|---|---|
| 5,533,020 | A | | 7/1996 | Byrn et al. ............. 370/60.1 |
| 5,659,699 | A | * | 8/1997 | Breternitz, Jr. ............ 711/216 |
| 5,671,406 | A | * | 9/1997 | Lubbers et al. ............ 707/7 |
| 5,706,288 | A | | 1/1998 | Radhakrishnan et al. ... 370/418 |
| 5,758,148 | A | * | 5/1998 | Lipovski ............. 707/6 |
| 5,835,494 | A | | 11/1998 | Hughes et al. ............ 370/397 |
| 5,887,174 | A | | 3/1999 | Simons et al. ............ 395/709 |
| 5,892,801 | A | | 4/1999 | Schneider ............ 375/348 |
| 5,938,736 | A | | 8/1999 | Muller et al. ............ 709/243 |
| 5,956,724 | A | | 9/1999 | Griffiths ............ 707/101 |
| 6,014,659 | A | * | 1/2000 | Wilkinson et al. ............ 707/3 |
| 6,044,222 | A | | 3/2000 | Simons et al. ............ 395/709 |
| 6,072,808 | A | | 6/2000 | O'Connor ............ 370/486 |
| 6,078,944 | A | | 6/2000 | Enko et al. ............ 709/105 |
| 6,105,048 | A | | 8/2000 | He ............ 709/100 |
| 6,161,144 | A | | 12/2000 | Michels et al. ............ 709/238 |

(Continued)

FOREIGN PATENT DOCUMENTS

JP    06068202    3/1994

OTHER PUBLICATIONS

P. McKenney et al., "Using Hardware Counters to Estimate Cache Warmth for Process/Thread Schedulers" U.S. Appl. No. 09/715,444, filed Nov. 16, 2000, abstract and claims 1, 20, 28.

*Primary Examiner*—Thuy N. Pardo
(74) *Attorney, Agent, or Firm*—Joscelyn G. Cockburn

(57) ABSTRACT

Apparatus, program product and method that schedules movement of packets within network devices, such as network processors, includes a time based calendar in which a segmented hierarchical routine is used to identify the calendar location of the next flow queue from which a packet is to be forwarded.

20 Claims, 16 Drawing Sheets

U.S. PATENT DOCUMENTS

| | | | |
|---|---|---|---|
| 6,223,172 B1 * | 4/2001 | Hunter et al. | 707/3 |
| 6,226,262 B1 | 5/2001 | Sterne et al. | 370/231 |
| 6,675,171 B1 * | 1/2004 | Tikkanen et al. | 707/101 |
| 6,741,990 B1 * | 5/2004 | Nair et al. | 707/9 |
| 6,877,005 B1 * | 4/2005 | Hunter et al. | 707/10 |
| 2002/0059197 A1 * | 5/2002 | Hunter et al. | 707/3 |

* cited by examiner

Diagram for Segment Search
Assuming That cp is In This Segment

Diagram for Segment Search Assuming
That cp is Not In This Segment

FIG. 9

Table 1: Data for cp_ct Searches

| SEARCH NAME | END POINTS | SEARCH OUTPUTS |
|---|---|---|
| cp_ct_SegSearch1 | m-1 or cp_seg, whichever is lower | cp_ct_SegSearch1 winner_valid, cp_ct_SegSearch1 winning location((p-1):0) |
| cp_ct_SegSearch2 | ct_seg or (cp_seg-1_, whichever is lower (no negative values) | cp_ct_SegSearch2 winner_valid, cp_ct_SegSearch2 winning location((p-1):0) |

Table 2: Data for cp_nct Searches

| SEARCH NAME | END POINTS | SEARCH OUTPUTS |
|---|---|---|
| cp_nct_SegSearch1 | m-1 | cp_nct_SegSearch1 winner_valid, cp_nct_SegSearch1 winning location((p-1):0) |
| cp_nct_SegSearch2 | cp_seg-1 | cp_nct_SegSearch2 winner_valid, cp_nct_SegSearch2 winning location((p-1):0) |

Table 3: Data for ncp_ct Search

| SEARCH NAME | END POINTS | SEARCH OUTPUTS |
|---|---|---|
| ncp_ct_SegSearch3 | ct_seg | ncp_ct_SegSearch3 winner_valid, ncp_ct_SegSearch3 winning location((p-1):0) |

Table 4: Data for ncp_nct Search

| SEARCH NAME | END POINTS | SEARCH OUTPUTS |
|---|---|---|
| ncp_nct_SegSearch3 | m-1 | ncp_nct_SegSearch3 winner_valid, ncp_nct_SegSearch3 winning location((p-1):0) |

SCALABLE HARDWARE SCHEDULER TIME BASED CALENDAR SEARCH ALGORITHM

The present application claims priority of the Provisional Application Ser. No. 60/325,500 filed on Sep. 27, 2001.

CROSS-REFERENCE TO RELATED PATENT APPLICATIONS

The present application relates to the following documents, assigned to the assignee of the present invention, incorporated herein by reference:

Patent application Ser. No. 09/834,141, filed Apr. 12, 2001 (priority date Apr. 13, 2000) by Brian M. Bass et al., entitled "Method and System for Network Processor Scheduling Based on Service Levels".

Patent application Ser. No. 09/546,651, filed Apr. 10, 2000, by Peter I. A. Barri et al., entitled "Method and System for Managing Congestion in a Network". This patent is sometimes referred to herein as the Flow Control Patent.

Patent application Ser. No. 09/547,280, filed Apr. 11, 2000, by Marco Heddes et al., entitled "Unified method and System for Scheduling and Discarding Packets in Computer Networks". This patent is sometimes referred to herein as the Packet Discard Patent.

Patent application Ser. No. 09/384,691, filed Aug. 27, 1999, by Brian Bass et al., entitled "Network Processor Processing Complex and Methods". This patent is sometimes referred to herein as the Network Processing Unit Patent or NPU Patent.

U.S. Pat. No. 6,222,380 entitled "High Speed Parallel/Serial Link for Data Communications" issued Apr. 24, 2001. This patent is sometimes referred to herein as the Link Patent.

Patent application Ser. No. 09/966,304 filed Sep. 27, 2001, by Darryl J. Rumph, entitled "Configurable Scheduler Calendar Search Algorithm".

BACKGROUND OF THE INVENTION

1. Field of the Invention

The present invention relates to communication network apparatus such as is used to link information handling systems or computers of various types and capabilities and to components and methods for data processing in such an apparatus. More particular the present invention relates to schedulers used in such devices to indicate when the next packet is to be transmitted from queues within the devices.

2. Description of the Prior Art

Scheduling the transmission of packets between points within a communications device or between points in the communications device and an external transmission network is well known in the prior art. The conventional approach is to provide a plurality of queues within the device and packets to be transmitted are enqueued to selected queues. A timing device sometimes called a timing wheel or calendar is searched to determine when the next packet is to be dequeued and forwarded from the queues. The selection, queueing and dequeueing of packets are controlled by several factors collectively referred to as Quality of Service (QoS). Because the factors and QoS requirements are well known in the prior art further discussion is not warranted. Suffice it to say U.S. Pat. Nos. 5,533,020 and 6,028,843 are examples of prior art.

Even though the prior art devices work well for their intended purposes and in the case of U.S. Pat. Nos. 5,533,020 and 6,028,843 the technology has been advanced beyond what it was at the time when these patents were invented, the communications technology is faced with new problems requiring new techniques and solutions.

One of the problems is that the volume of data has increased due to the increase in the number of users. There are also demands to improve QoS. To address these problems it is desirable to use a hardware scheduler to schedule the transmission of packets from queues in the network devices. It is common knowledge that the hardware implementation of a device or function is usually faster than its corresponding software implementation. On the other hand it is easier to change the software implementation of a device or function than it is to change the hardware implementation.

Notwithstanding, the hardware implementation of a scheduler presents certain problems which have to be addressed if the scheduler is to be used in an environment in which QoS and packet throughput are relatively high. Among the problems to overcome are:

(1) a physical limitation as to how much "searching" can be done in one of the system clock cycles, as each circuit in the hardware implementation consumes a finite amount of time against the clock period.

(2) a finite number of clock cycles that the search must be completed by, as the winning calendar location (discussed below) must be used by the Scheduler circuits downstream as a part of the overall Scheduler function. So, reducing the number of clock cycles it takes to find a winner is very important.

(3) a need to change the number of entries in the timing wheel for the search to meet customer demands, as new generations of Hardware Scheduler or related functions emerge.

(4) changing system clock frequencies.

(5) changing hardware technologies.

The scheduler and in particular the time share calendar search described below overcomes these problems and can be easily redesigned to meet new requirements due to change in technology, increase in the amount of packets to be handled, etc.

SUMMARY OF THE INVENTION

The scheduler includes a plurality of functions working in a cooperative manner to transmit packets in accordance with predetermined QoS requirements.

One of the functions in the scheduler is the time based calendar which identifies the next packet to be transferred from one of the queues to which it had been enqueued. The present invention provides a scalable time based calendar which can be changed to provide a lower-cost higher performance solution than was heretofore been possible.

The time based calendar according to the teachings of the present invention overcomes the problems set forth above.

The time based calendar includes a search region, preferably in a memory, containing multiple consecutive locations. Each location includes a status bit or indicator bit and space to store information. The indicator bit can be set in one state when data is stored in the space and another state when there is no data. The intent of the search is to begin at a starting point, searching forward from that starting point up to and including an ending point. The first location that is encountered that has a valid entry is called the "winning location".

The search region is partitioned into multiple segments. Each segment, containing a portion of the total number of locations within the search region, is searched from a Search Starting Point (CP) to an end point (CT) by a Segment Search engine in accordance with predetermined algorithms and certain assumptions regarding CP (also termed Current Pointer) and CT (also termed Current Time).

Each of the segment search engines generates information identifying the first position between the CP and the CT having the indicator bit set to a logical '1' (called Interim Winner Valid) and the winning location. The information is stored and is used by the Top Search Engine to generate a Final Winner, if there is one.

Another search engine termed Top Search Engine processes the information from the segment search engines to determine whether or not there is a Final Winner Valid and its location. Another function in the scheduler uses the Final Winner Valid indicator and the Queue identification (ID) at the location to move the next packet from the queue with like Queue ID to a target port or target blade in the network device.

The Search Starting Point (CP) for each segment is the same. The number of bits required for CP for each segment is such that the number of inputs into the segment can be represented. For example, if a segment has 256 inputs (each input represents a position in the search region) the number of bits that CP has is $\log_2 256=8$. The time component of the search (CT) for each segment is the same. The number of bits required for CT is exactly the same as for CP. The maximum value of CP for the segment would be 255.

The assumptions for each segment are the same and are as follows:
(1) CP is not in the segment, and CT is not in the segment. For this assumption the search for the interim valid CP is from the current CP position (calculated above) to the top (last) location in the segment.
(2) CP is not in the segment, and CT is in the segment. For this assumption the search for the interim valid CP is from the current CP position (calculated above) to the CT location.
(3) CP is in the segment, and CT is not in the segment. For this assumption two searches are performed.
   (i) One search is from CP to the top of the segment.
   (ii) The other search is from the bottom of the segment to the position preceding the CP position in i).
(4) CP is in the segment, and CT is in the segment. For this assumption two searches are performed.
   (i) One search is from CP to either the top of the segment or the CT location, whichever is encountered first.
   (ii) The other search is from the bottom of the segment to either the location preceding CP or the CT location, whichever is encountered first.

It should be noted the CP is identified by a pointer which is stepped by another function associated with the scheduler. It should also be noted that CT is identified by a periodically changing pointer that changes as a function of the time basis of the search. At least one search will be conducted each time that this input changes.

For the segment searches, the search starting point (cp_seg), and the search end point (ct_seg), are the same value for each of the segments, and that value is the least significant bits of the binary representations of cp_seg and ct_seg, respectively. The bit ranges of both cp_seg and ct_seg are sufficient to represent all m entries of the segment. The n segment outputs are fed to the "top search" engine. The top search engine begins searching from the segment indicated by the most significant bits of the binary representation of cp, or cp_top. The top search engine terminates the search at the segment indicated by the most significant bits of the binary representation of ct, or ct_top. The bit ranges of both cp_top and ct_top are sufficient to represent all n segments of the entire calendar. The Top Search Engine will use the data provided by the segment containing cp, along with the data provided by the other segments to conduct the search, as long as the end point segment (ct_top) has not been reached, until it finds a segment that contains a winner, if there is one. The overall winning location is a concatenation of the segment containing a winner (most significant bits of is overall winner), along with the winning location within the segment (least significant bits of overall winner).

The segment search does not include the entire calendar. Because of this, the segment search provides
(1) search output data assuming that this segment contains neither CP nor CT,
(2) search output data assuming that this segment does not contain CP, but contains CT,
(3) search output data assuming that this segment contains CP, but does not contain CT, and
(4) search output data assuming that this segment contains both CP and CT.

For the assumption that the segment contains neither CP nor CT, the search begins at the bottom of the segment and continues upward in the segment until either a winner is found or the end point for that search is reached. For the assumption that the segment does not contain CP, but contains CT, the search begins at the bottom of the segment and continues upward in the segment until either a winner is found, or the end point for that search is reached.

For the assumption that the segment contains CP but does not contain CT, and also the assumption that the segment contains both CP and CT, there are two individual searches. The first search begins at the entry corresponding to CP (cp_seg), and continues upward in the segment until either a winner is found, or the end point for that search is reached. The second search begins at the bottom of the segment and continues upward in the segment until either a winner is found or the end point for that search is reached.

Depending on the scenario, the ending search point for each search is not always the same. For each of these searches, there must be an indication that a winner has been found, and the winning location that is qualified by that indication.

In order to obtain end points for the three searches, four assumptions are made, and segment winners based on each assumption are generated:
A) cp is in this segment, ct is in this segment
   Because cp is in this segment, SegSearch1 (called cp_ct_SegSearch1) and SegSearch2 (called cp_ct_SegSearch2) are conducted.
B) cp is in this segment, ct is not in this segment
   Because cp is in this segment, SegSearch1 (called cp_nct_SegSearch1) and SegSearch2 (called cp_nct_SegSearch2) are conducted.
C) cp is not in this segment, ct is in this segment
   Because cp is not in this segment, SegSearch3 (called ncp_ct_SegSearch3) is conducted.
D) cp is not in this segment, ct is not in this segment
   Because cp is not in this segment, SegSearch3 (called ncp_nct_SegSearch3) is conducted.

The Top Search Engine processes the segment information by executing an algorithm which identifies the segment containing the CP. The algorithm is the high order bits of the digital representation of the number of segments. Using the example where there are 512 calendar locations, broken into eight 64-location segments, a top search winning value of binary "010" indicates that the segment search output for segment "010" must be use to determine the final winning location. If the winning location for segment "010" was a value of binary "111011", then the winning location would be represented in 9-bit binary as "010111011", corresponding to 221 decimal. As is evident from the example the final winning location is the identification (ID) for the segment containing the winner concatenated to the value for the winning location within the segment containing the winner.

By searching the Time Based calendar in accordance with the teachings of the present invention a dynamic Time Based calendar and scheduler is provided. The Time Based calendar and its associated scheduler are dynamic in that they can easily be redesigned to accommodate changes in the technology, size of the search region, changes in system clock frequencies, etc.

BRIEF DESCRIPTION OF THE DRAWINGS

FIG. 9 consisting of Table 1 through Table 4, shows graphical representation of assumptions made for CP and CT.

DETAILED DESCRIPTION OF THE PREFERRED EMBODIMENT

The invention described hereinafter may be used in any environment, particularly in computers, where a circular structure with a specific number of locations is to be searched. It works well in communications devices such as an interface device, also called Network Processor, and as such is described in that environment. However, this should not be a limitation on the scope of the invention since it is well within the skill of one skilled in the art to make changes or modification to adapt the invention to several other technologies. Any such changes or modification is intended to be covered by the claims set forth herein.

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
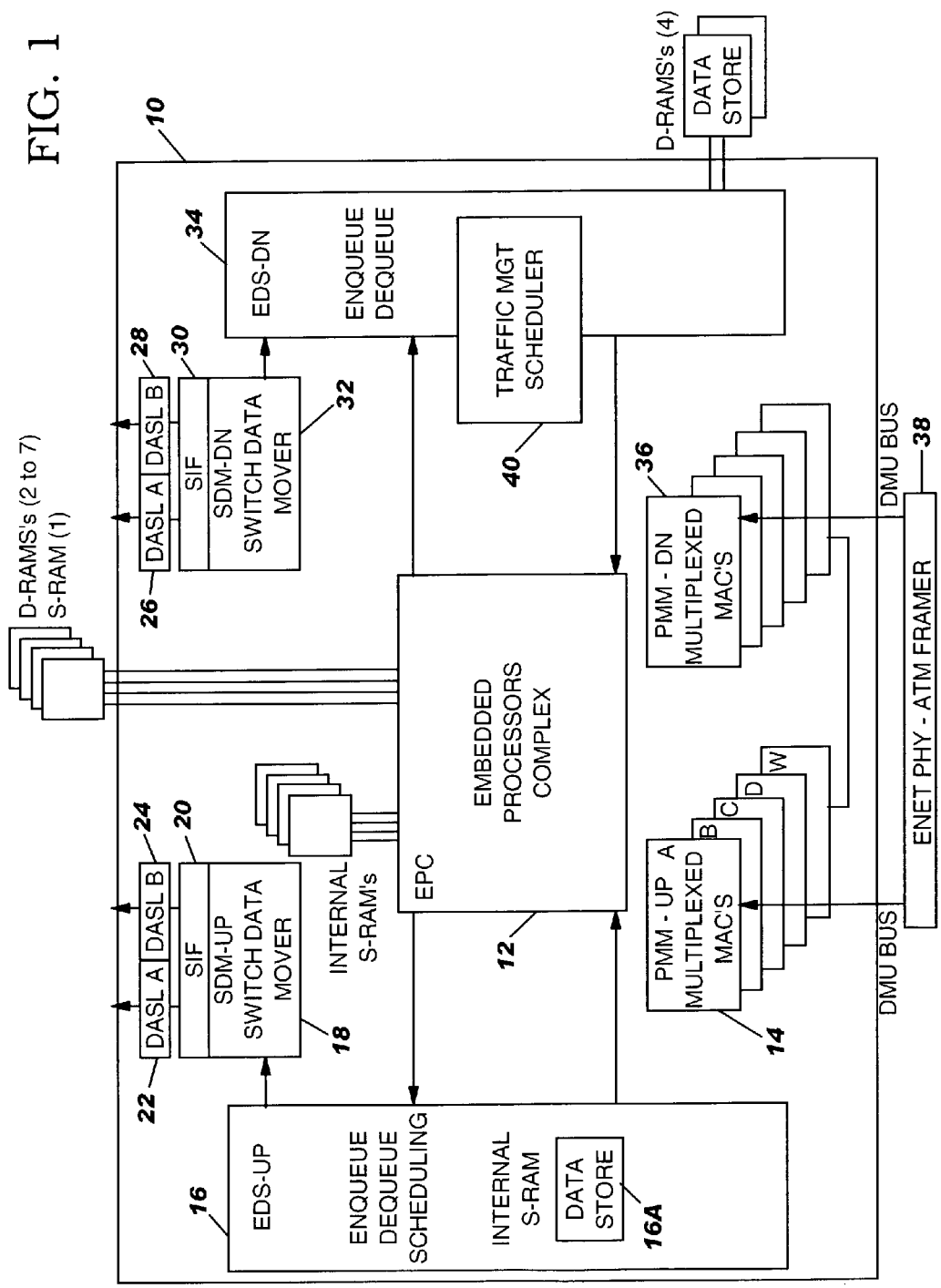
FIG. 1 is a block diagram of an interface device or Network Processor (NP) showing Embedded Processor Complex, DN Enqueue/Dequeue System and Traffic Management (MGT) Scheduler useful in practicing the present invention.

FIG. 1 shows a block diagram of the interface device chip that includes the substrate 10 and a plurality of subassemblies integrated on the substrate. The subassemblies are arranged into an upside configuration and a downside configuration, with the "upside" configuration (sometimes also referred to as an "ingress") referring to those components relating to data inbound to the chip from a data transmission network (up to or into the chip) and "downside" (sometimes referred to as an "egress") referring to those components whose function is to transmit data from the chip toward the data transmission network in an outbound fashion (away from the chip or down and into the network). The invention described hereinafter is in the egress portion of the chip. Data flows follow the respective arrangements of the upside and downside configurations; thus, there is a upside data flow and a downside data flow in the system of FIG. 1. The upside or ingress configuration elements include an Enqueue-Dequeue-Scheduling UP (EDS-UP) logic 16, multiple multiplexed MAC's-UP (PMM-UP) 14, Switch Data Mover-UP (SDM-UP) 18, System Interface (SIF) 20, Data Align Serial Link A (DASL-A) 22 and Data Align Serial Link B (DASL-B) 24. Data links are more fully described in the Link Patent referenced above, and reference should be made to that document for a greater understanding of this portion of the system. It should be understood that the preferred embodiment of the present invention uses the data links as more fully described in that patent, other systems can be used to advantage with the present invention, particularly those which support relatively high data flows and system requirements, since the present invention is not limited to those specific auxiliary devices such as the data links which are employed in the preferred embodiment.

The components depicted on the downside (or egress) of the system include data links DASL-A 26 and DASL-B 28, system interface SIF 30, switch data mover SDM-DN 32, enqueue-dequeue-scheduler EDS-DN 34 and multiple multiplexed MAC's for the egress PMM-DN 36. The substrate 10 also includes a plurality of internal static random access memory components (S-RAM's), a traffic management scheduler (TRAFFIC MGT SCHEDULER, also known as the Egress Scheduler containing the teachings of the present invention) 40 and an embedded processor complex 12 described in greater depth in the NPU Patent referenced above. An interface device 38 is coupled by the respective DMU busses to PMM 14, 36. The interface device 38 could be any suitable hardware apparatus for connecting to the L1 circuitry, such as Ethernet physical (ENET PHY) devices or asynchronous transfer mode framing equipment (ATM FRAMER), both of which are examples of devices which are well known and generally available for this purpose in the trade. The type and size of the interface device are determined, at least in part, by the network media to which the present chip and its system are attached. A plurality of external dynamic random access memory devices (D-RAMS) and a S-RAM are available for use by the chip.

While here particularly disclosed for networks in which the general data flow outside the relevant switching and routing devices is passed through electric conductors such as wires and cables installed in buildings, the present invention contemplates that the network switches and components thereof could be used in a wireless environment as well. For example, the media access control (MAC) elements herein disclosed may be replaced with suitable radio frequency devices, such as those made from silicon germanium technology, which would result in the connection of the device disclosed directly to a wireless network. Where such technology is appropriately employed, the radio frequency elements can be integrated into the VLSI structures disclosed herein by a person of skill in the appropriate arts. Alternatively, radio frequency or other wireless response devices such as infrared (IR) response devices can be mounted on a blade with the other elements herein disclosed to achieve a switch apparatus which is useful with wireless network apparatus.

The arrows show the general flow of data within the interface system shown in FIG. 1. Frames of data or messages (also sometimes referred to as packets or information units) received from an Ethernet MAC 14 off the ENET PHY block 38 via the DMU bus are placed in internal data store buffers 16a by the EDS-UP device 16. The frames may be identified as either normal frames or guided frames, which then relates to method and location of the subsequent processing in the plurality of processors in the EPC. After the input units or frames are processed by one of the plurality of processors in the embedded processor complex, the completed information units are scheduled through the scheduler 40 out of the processing unit 10 and onto the data transmission network through the PMM-DN multiplexed MAC's 36 and the physical layer 38. It is the scheduling of data by the scheduler 40 that the present invention will describe hereinafter.

Figure 2:
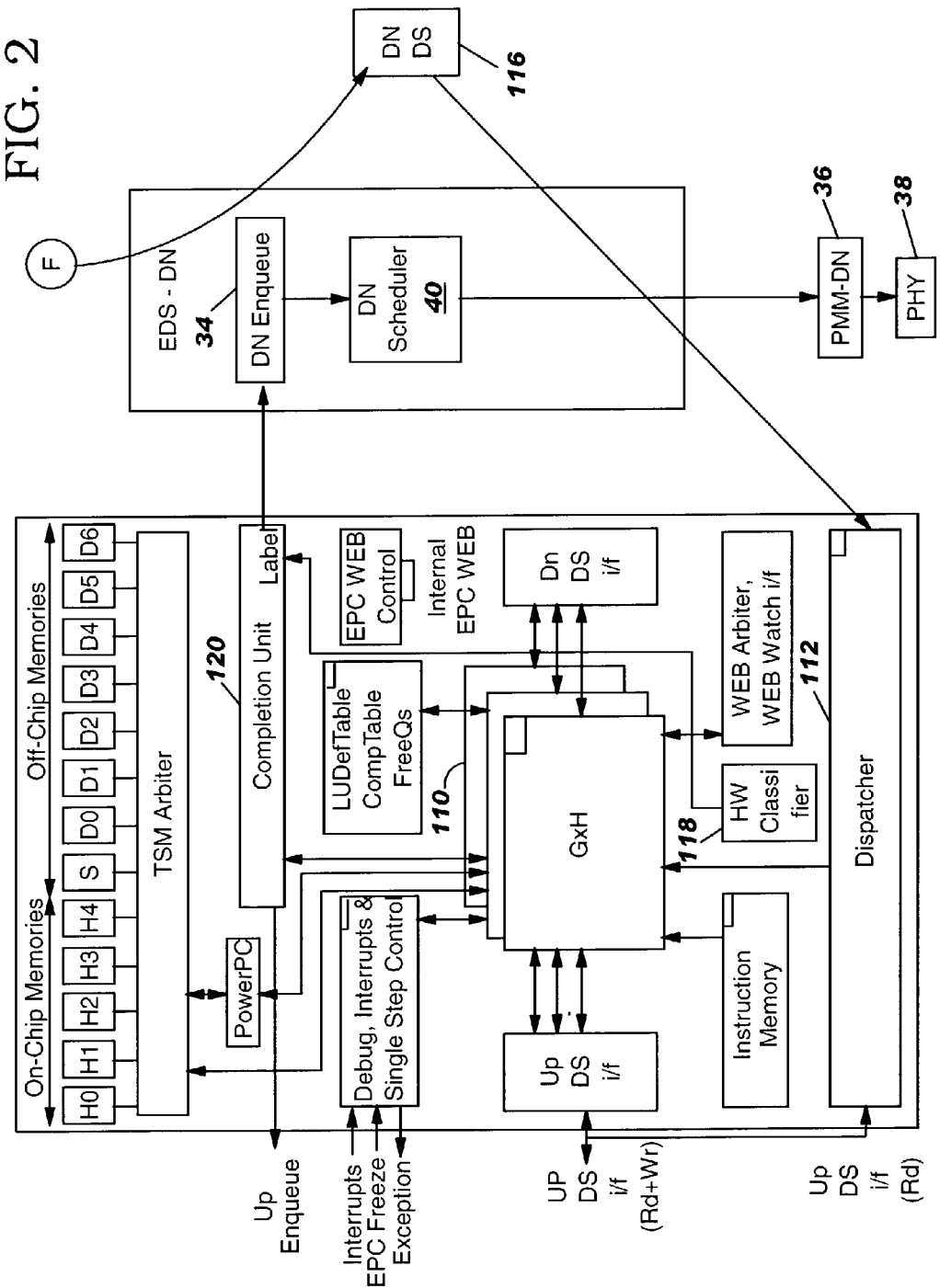
FIG. 2 is a block diagram of the embedded processor complex, DN Enqueue and DN Scheduler.

FIG. 2 is a block diagram of a processing system which can employ the present invention to advantage. In this FIG. 2, a plurality of processing units 110 are located between a dispatcher unit 112 and a completion unit 120. Each incoming frame F (from a switch, not shown, attached to the present data processing system) is received and stored into a DOWN data store (or DN DS) 116, then sequentially removed by the dispatcher 112 and assigned to one of the plurality of processing units 110, based on a determination by the dispatcher 112 that the processing unit is available to process the frame. Greater detail on the structure and function of the processing units 110 in particular, and the processing system in general, can be found in the NPU Patent references above and patent applications and descriptions of the individual components such as a flow control device detailed in the Flow Control Patent. Interposed between the dispatcher 112 and the plurality of processing units 110 is a hardware classifier assist 118 which is described in more detail in a pending U.S. patent application Ser. No. 09/479,027 filed Jan. 7, 2000 by J. L. Calvignac et al. and assigned to the assignee of the present invention, an application which is incorporated herein by reference. The frames which are processed by the plurality of network processors 110 go into a completion unit 120 which is coupled to the DN Enqueue 34 through a flow control system as described in the Flow Control Patent and the Packet Discard Patent. The DN Enqueue 34 is coupled to the Dn Scheduler which is coupled through the PMM DN MAC's 36, then by the DMU data bus to the physical layer 38 (the data transmission network itself).

Figure 3:
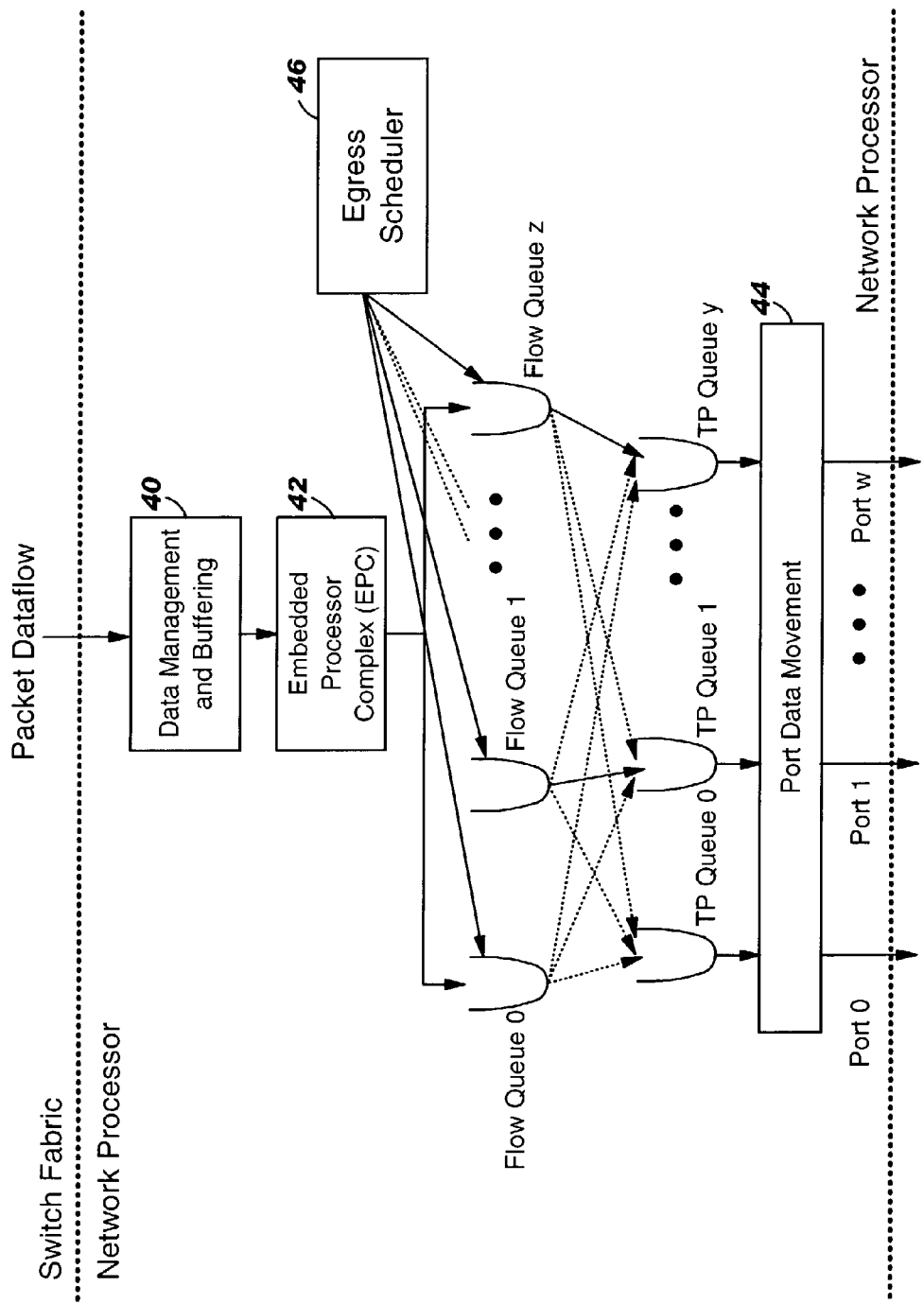
FIG. 3 is a block diagram of components required to understand the invention and are provided on the egress side of the interface device.

FIG. 3 shows a block diagram of the data flow on the Egress side of the Network Processor. It should be noted that Network Processor (NP) and Interface Device are used interchangeably. To make the figure less complicated only components which are necessary to understand the invention are shown. The components include Data Management and Buffering 40, Embedded Processor Complex 42, Flow Queues 0–Z, target port (TP) queues 0–Y, Port Data Movement 44 and Egress Scheduler 46. Each egress packet enters the Network Processor from a switched fabric against a "connection", that is, a definition of a path from the switched fabric to a specific output port. Prior to sending of any packet data this path is defined. Included in this path is the addressing information that is a part of the packet "header". This header is part of a table definition in the EPC that allows the EPC to determine the destination flow queue to which the data is enqueued. Each flow queue has a Queue Control Block (QCB) contained in the scheduler function that defines the destination target port (TP) in that flow queue.

Still referring to FIG. 3, egress packets enter the Network Processor and are buffered (stored) by Data Management and Buffering 40 which is responsible for managing the pointer to the packet data. These pointers will be passed to each functional block that will process the packet ending with the step where the packet data exits the Network Processor through the output ports. The Egress Scheduler 46 monitors the flow queues, and as packets are placed in a selected queue, the Egress Scheduler initiates movements of those packets in accordance with the invention to be described hereinafter and other Quality of Service (QoS) requirements to the appropriate target port from which the port data movement 44 packages the data in accordance with predetermined transmission protocol such as ethernet, etc., and forwards the data through one of the ports 0 through port w.

Figure 4:
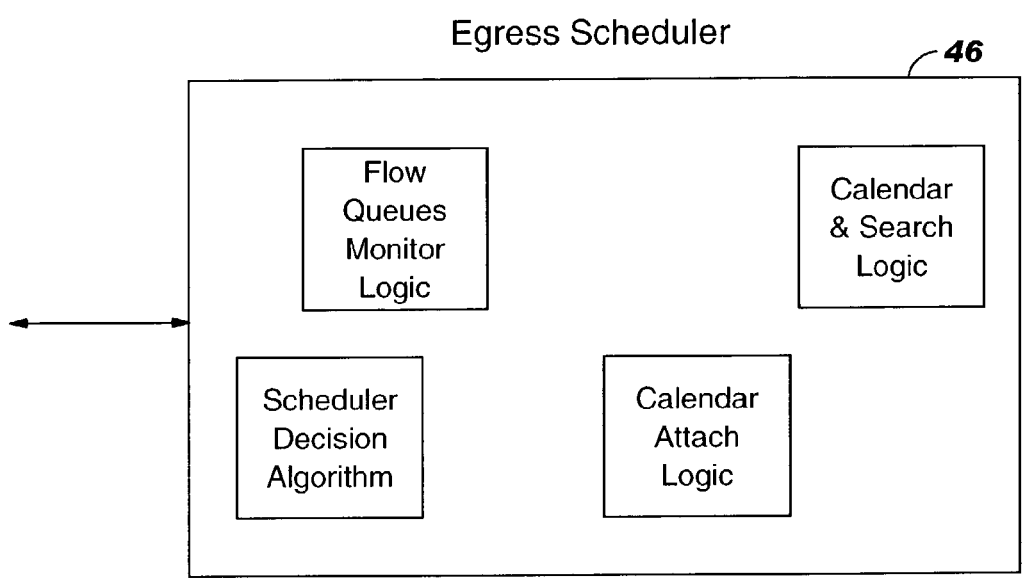
FIG. 4 is a logical representation of the Egress scheduler showing functional units according to the teachings of the present invention.

FIG. 4 shows a block diagram of Egress Scheduler 46. The function of Egress Scheduler 46 is to monitor the flow queues and at appropriate times determined by the invention herein move packets from flow queue to the target port (TP) Queue. To this end the Egress Scheduler 46 includes a plurality of functions which cooperate to provide the overall function of the scheduler. Included in the functions are the flow queue monitor logic which monitors flow queue to determine when a data packet is placed in a flow queue by the Embedded Processor Complex. The Egress Scheduler 46 also includes the calendar and search logic (to be described hereinafter), calendar attach logic etc.

It should be noted that even though the functions which are necessary for the Egress Scheduler 46 to carry out its function are shown in FIG. 4 as internal to the scheduler this is only a logical representation. In an actual Network Processor some of these functions may be located elsewhere in the Network Processor and not necessarily within the scheduler itself.

Still referring to FIGS. 3 and 4, the data packets enter the traffic flow queue 0–Z at a given queue id. Each of the queue ids has a level of service requirement, as specified via the QoS parameters. When a packet enters a queue, the Scheduler 46 determines when this packet may exit the same traffic queue id. This determination is performed by attaching the queue id to one of the locations of the calendar (details set forth herein) per the queue service requirements and using the network scheduler decision algorithm. There may be more than one packet in the traffic queue at any one time in that another packet may enter the same queue id before the scheduler determines that a packet may exit the queue. When there is one or more data packets in a traffic flow queue a queue will be attached to one of the many network scheduler calendars which indicates that the queue will be serviced at a later time. When a packet exits the queue, the scheduler will remove the queue id from the calendar location from which it was attached. If a packet exits the traffic queue and there is at least one additional packet in the queue, the scheduler will reattach this queue to another calendar location for service (packet exits from the queue) at a later time. If there are no more packets in the queue after packet exits, the scheduler will not reattach this queue to a calendar location. The scheduler continues to select traffic queues for service, one by one, until there are no more remaining packets in the traffic flow queues. During normal scheduler operation only one packet may enter a traffic flow queue during a "TICK" cycle. A "TICK" cycle is defined as a fixed number of system clock cycles in duration, and only one packet may enter and exit any of the traffic queues during a "TICK'" cycle. Whenever one or more packets are in a traffic queue, this queue will be attached to one of the network scheduler calendars by the scheduler. This attachment indicates that a packet is due at some time in the future to exit the traffic queue. Only one packet may enter/exit one traffic queue at a time so there cannot be simultaneous packet entries into two or more queues nor can there be simultaneous packet exits from two or more queues.

In particular, FIG. 3 shows a diagram of the Network Scheduler operating as follows:

Data packets enter the traffic queue at a given queue ID. Each of the queue ID's have a level of service requirement. When a packet enters a queue, the network scheduler determines when this packet may exit the same traffic queue. There may be more than one packet in the traffic queue at any given time, in that another packet may enter the same queue before the first packet has exited the queue. The determination of when a packet may exit a flow queue is performed by (1) attaching the queue ID to one of the Calendars at a specific calendar location, as specified by the algorithm; and (2) considering this queue ID, along with other queue ID's that have been attached to the same or other calendar location for service via a calendar search. The search will determine which calendar location is the proper location that should be serviced next, if at all, and this calendar location is determined to be the "winning calendar location". The flow queue ID that has been attached to the winning calendar location will be serviced via moving a packet from this flow queue. At this time, the scheduler will detach this queue ID from the location where it was attached. If there is an additional packet in the queue after the packet has exited, the scheduler will reattach this queue ID to another calendar location per the algorithm. If there are no more packets in the queue after the first packet has exited, the scheduler will not reattach this queue to a calendar. The scheduler continues to select traffic queues for service in this fashion, one-by-one, until there are no more remaining packets in any of the traffic queues.

Figure 5:
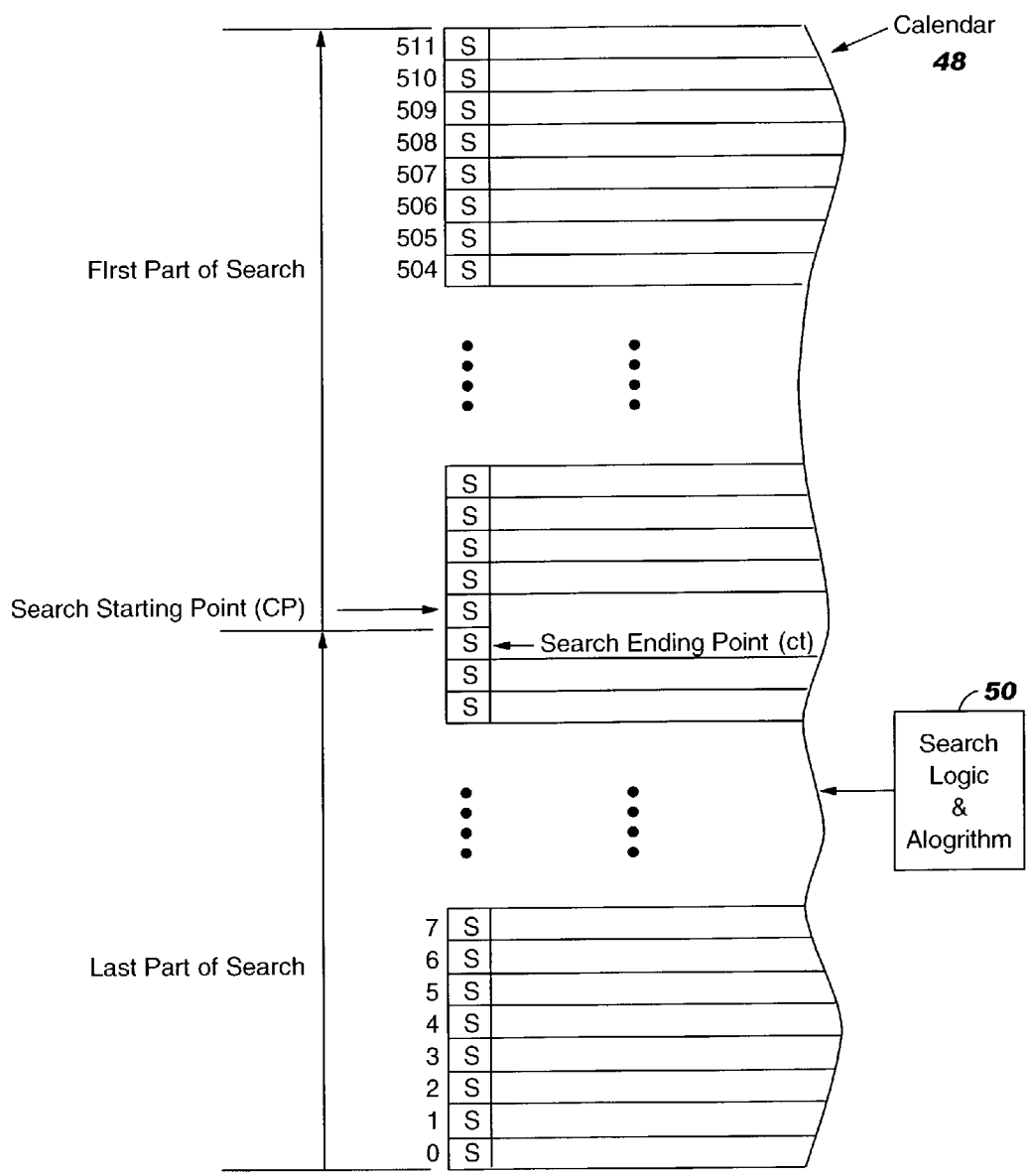
FIG. 5 shows a block diagram of the Time Based calendar system, including search region and search logic, according to the teachings of the present invention.

FIG. 5 shows a block diagram of the Time Based calendar system according to the teachings of the present invention. The calendar system includes calendar 48 and search logic 50. The calendar 48 defines a search zone usually a portion of memory which includes a plurality of locations. For example, in FIG. 5 search zone has 512 locations 0–511 ($2^9$) search locations. Each search location has a number, a status bit (S) and an associated space in which information such as Flow Queue id can be written and stored. When the scheduler attaches a flow queue to the calendar the id of the queue is written in the space at one of these locations. The status indicator(s) is a bit which can be set in one of two states (0, 1). In this implementation of the invention when S is set to 1 this means a valid location with an associated queue id stored in the space associated with the indicator. The management, such as writing/deleting etc., of the calendar is done by logic in the scheduler. This logic performs such functions as setting/resetting bits, writing information in the space, etc. The Search Logic 50 and algorithm provides a facility that searches the calendar to determine which queue id will be elected from which the next flow will be transmitted from the traffic flow queue to a target port or target blade of a network processor.

Still referring to FIG. 5, all searches have two parts. A first part of the search begins at a search starting point (CP) to the last element in the search region. The second part of the search begins at the first element in the search region and ends at a search ending point CT. In FIG. 5 the end point is shown as the last element before the CP whereat the search began but the end point could have placed at any other location within the search region. The result is that for a Time Based calendar the search region for a particular search is bounded by CP (beginning search point) and CT (search ending point). The search cannot extend beyond the search ending point. The part of the search beginning at the location 0 and ending at the location prior to the search start point is shown in FIG. 5 as the Last Part of Search. The search beginning at the CP and ending at the top is shown in FIG. 5 as First Part of Search. The search starting point for each search is identified by a first pointer which is moved sequentially by the algorithm in the scheduler. Similarly the search ending point for each search is identified by a second pointer which is moved sequentially by the algorithm in the scheduler. The intent of searching the calendar is to detect the first location following the CP whereat the calendar location status (S) indicator is set to 1. This location is referred to as the Winning Location and the queue id associated with that location is the queue from which data may be transferred. In order to describe the invention hereinafter the following terminologies will be followed. The calendar is an entity which includes a specified number of locations, each of which may contain a valid candidate. A candidate is valid if there are one or more traffic queues attached to that calendar location. A calendar search is conducted per a pre-defined search algorithm. The decision as to whether or not there is a winner for the calendar, along with the Winning Location (in the case that a winner is selected) is made per the algorithm set forth hereinafter.

Referring again to FIG. 5, because the searching begins from a starting point to the top of a segment wrapped around to the beginning of the calendar and progresses back to the location adjoining the point where the search began the calendar could be viewed as a circular entity. Each entry contains data which indicates whether or not a valid candidate is at this location. If a valid candidate is not found at the start location the next location in the 512 entry search sequence is checked for a valid entry (one in which the status bit is set to 1). The search continues sequentially through all 512 locations. The last search location is the location previous to the start location until either the first valid candidate (winner) is found or there are no valid candidates for entry on any of the 512 locations. When the first valid entry is encountered, the search must indicate that a Winner has been found, along with the corresponding winning location. For this type of search arrangement the search must be able to locate the winner using a start point at any location on the calendar and must be able to search through all 512 locations in a relatively short period of time which is usually set by the Quality of Service and other constraints of the system. Because of these constraints, the present invention provides the search routine which uses only two machine cycles to effectuate the search no matter where the valid entry is located within the 512 locations of the calendar.

Figure 6:
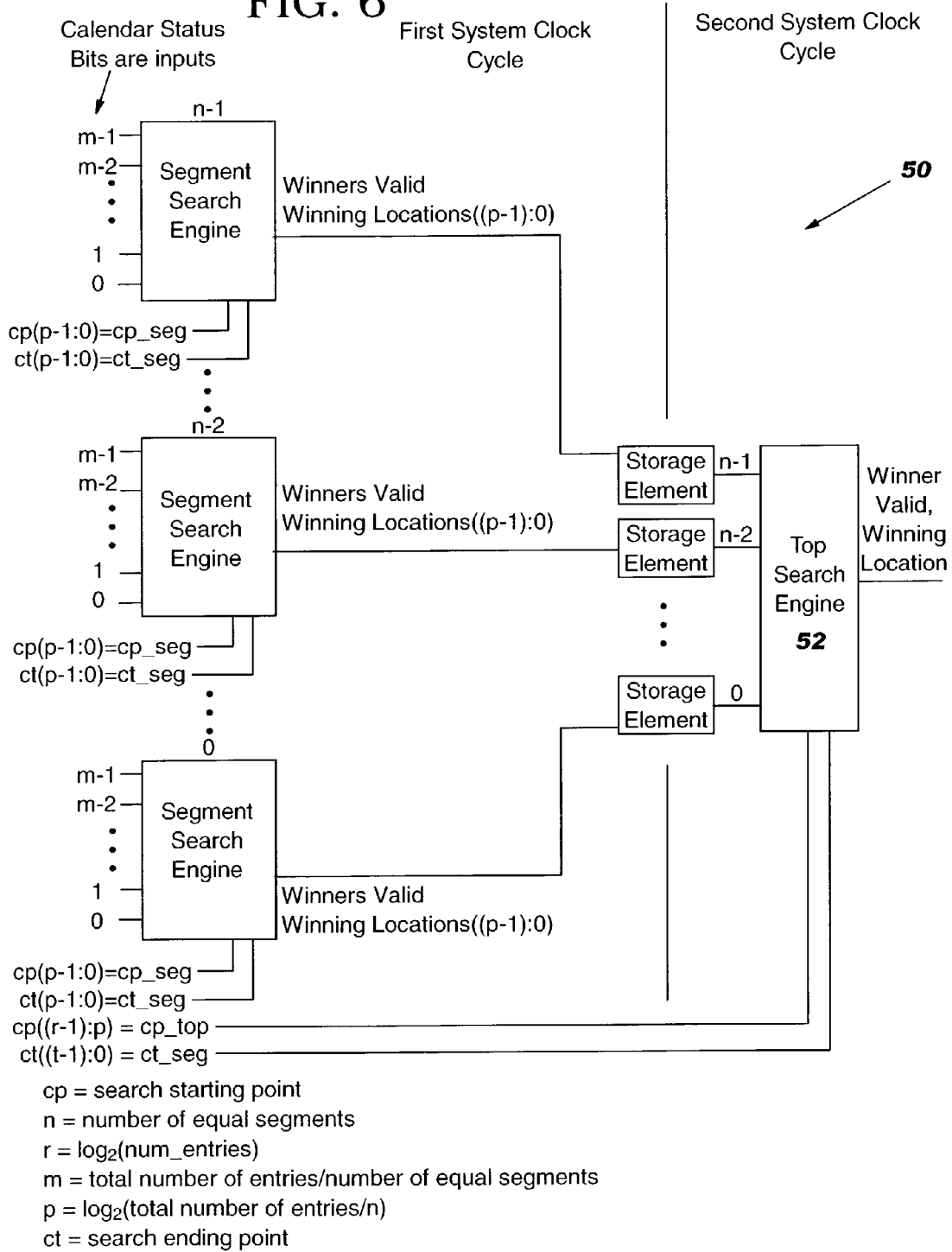
FIG. 6 shows a block diagram of the search logic.

FIG. 6 shows a block diagram of the search logic and algorithm 50. The search logic includes a plurality of segment search engines numbered 0 through n-1. The input into each of the segment search engines includes the starting point where the search begins, indicated in the FIG. 6 as CP-SEG, and ending point where the search ends, indicated in the FIG. 6 as CT-SEG. The other inputs into each of the segment search engines includes the output from calendar status bits, indicated as 0, 1 . . . M-2, and M-1, associated with the particular segment. Stated another way, the search zone is broken up into n segments (n greater than 0), and the number of locations in the segment is fed into that segment search engine. The segment search is conducted during the first system clock cycle. The output from each segment search engine is fed into separate storage elements, labeled 0 through n-1, and the output from the storage elements are fed into Top Search Engine 52. Control signals labeled CP-TOP and CT-TOP are also provided to Top Search Engine 52. CP-TOP represents the segment in which CP is located and is calculated as set forth herein. Likewise, CT indicates the segment whereat CT is located. The top search is conducted during the second clock cycle. The output information from Top Search Engine 52, Winner Valid and the Winning Location are fed to the scheduler which moves the frame in the Flow Queue associated with that location into the Target Port Queue. As can be seen in FIG. 6 the information generated by each segment is a Winner Valid information and the Winning Location. As stated previously this location is the first one that has its status bit set to logical "1" (ON) after the CP but before CT. Stated another way it's the first location upstream from the CP and before CT that has its status bit activated. It should also be noted that two system clock cycles are required for the search of the 512 locations. The searching is done simultaneously rather than sequentially. By segmenting the search zone and executing the search simultaneously, the Winning Location (first location after CP with its bit set) can be detected in a very short period of to meet specific Quality of Service requirements of the system.

Still referring to FIG. 6, the search region is partitioned into n different sub-regions, or segments, where n is greater than 0. The segments are searched simultaneously by a common searching routine. Each segment search contains m entries, beginning search position (CP-SEG) and ending search position (CT-SEG). The results of each segment search are captured by a storage element. The second search or Top Search is performed taking the outputs of each of the storage elements and generating the final result.

For the segment searches the value of cp_seg is the same value for each of the segments. The value of cp_seg is the least significant bits of the binary representation of cp. The bit range of cp_seg is sufficient to represent all m entries in the segment. For example, if the calendar has 512 entries each segment contains 64 entries (m=64), then the number of bits necessary to represent cp_seg is equal to $\log_2 64=6$. The number of bits for the cp_top is equivalent to those necessary to represent the number of segments. For example, if there are 8 segments, then the number of bits for the top cp would be $\log_2 8=3$. Concatenating cp_top with the cp_seg would yield the complete value of cp. For example, if the entire calendar range was 512 values, this could be represented with 9 bits. If the desired number of segments were 8, this means that there are 512/8, or 64 calendar entries per segment. For example, if the value of cp were decimal 314, the binary value of 314 would be "1 0011 1010". Because there are 8 segments, the value of cp_top would be the three most significant bits of the binary value of 314, or "100" binary. The three most significant bits are used because three bits are necessary to represent 8 segments. The value of cp_seg would be equal to the 6 least significant bits of decimal 314, or a binary value of "11 1010".

For the segment searches the value of ct_seg is the same value for each of the segment. The generation of ct_seg and ct_top, given the binary representation of ct is identical to the generation (described above) of cp_seg and cp_top, given the binary representation of cp.

Still referring to FIG. 6 the n segment outputs are fed to the Top Search Engine 52 on the second system clock cycle after leaving the storage element. The Top Search Engine 52 begins searching from the segment indicated by the most significant bit of the binary representation of CP, and identified as CP-Top. The range of CP-Top is sufficient to represent all n segments of the entire calendar. The Top Search Engine will use the data provided by the segment containing CP, along with the data provided by the other segments to conduct the search until it finds a Winning Location if there is one or until the search ending point is reached. For the Top Search, the search ending segment is indicated by the most significant bits of the binary representation of CT, and identified as CT-Top. The range of CT-Top is sufficient to represent all n segments of the entire calendar. The overall Winning Location is a concatenation of the segment containing the winner (most significant bits of the overall winner), along with the winning location within the segment (least significant bits of the overall winner). Using the example where there are 512 calendar locations, broken into eight 64-location search a top search winning value of binary "010" indicates that the segment search output for segment "010" must be use to determine the final winning location. If the winning location for segment "010" was a value of binary "111011", then the winning location would be represented in 9-bit binary as "0 1011 1011", corresponding to 221 decimal.

Figure 7:
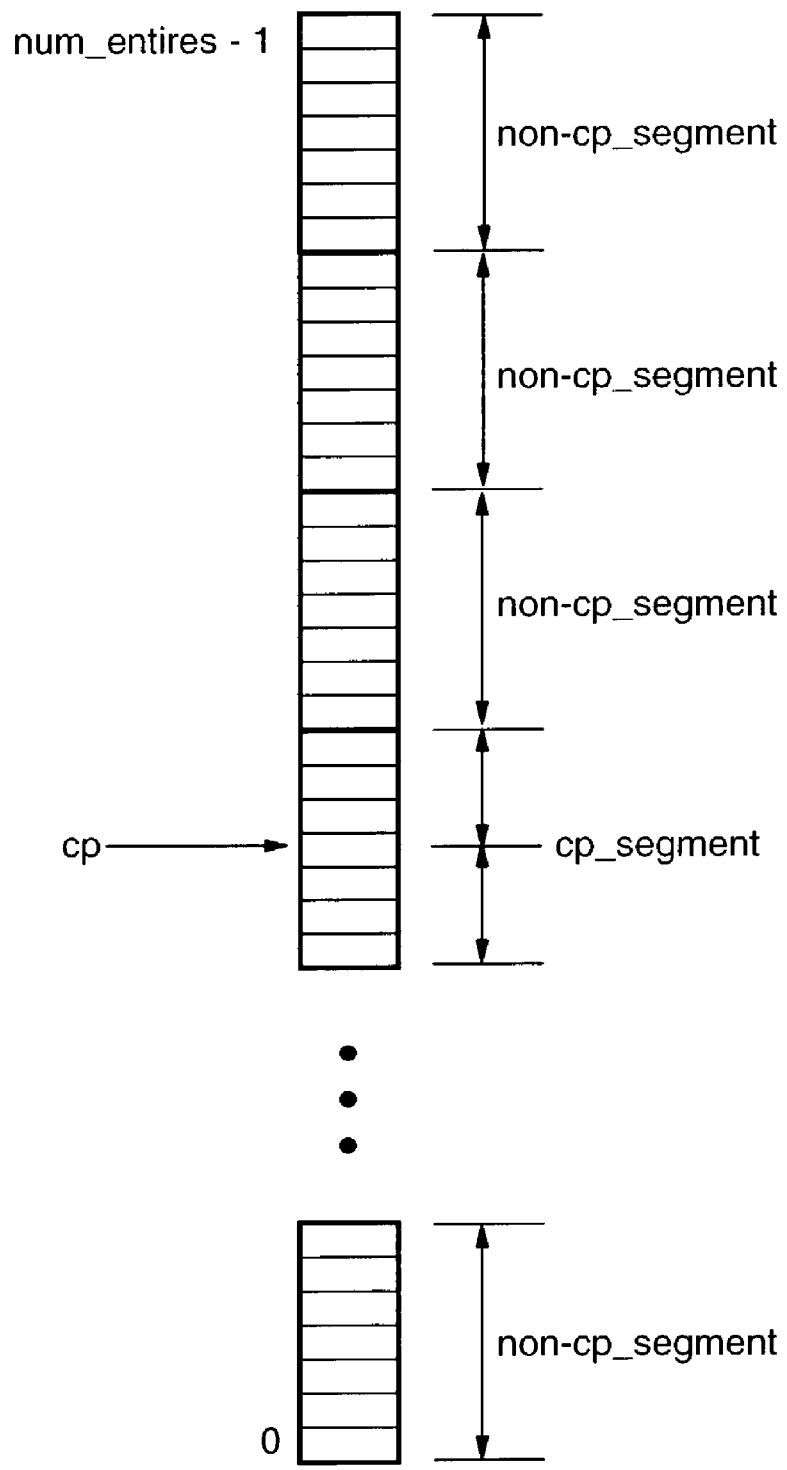
FIG. 7 shows graphical representation of the general case for searching segments containing starting point (CP) and segments not containing a Starting Point (CP).

All bits of the starting point (CP) representation are not passed onto the segment search. Therefore, there is insufficient data to determine whether or not this segment truly contains CP. Also, not all bits of the end point (CT) representation are passed onto the segment search. Therefore, there is insufficient data to determine whether or not this segment truly contains CT. Because of these uncertainties, assumptions have to be made in order to determine the true starting point. The assumptions are: 1) the OP is in the segment and 2) the OP is not in the segment. Turning to FIG. 7 for the moment a graphical representation of the general case of searching segments containing starting point (CP) and segments not containing a starting point (CP) are shown. As is evident from the figure, the non-CP segment searching begins at the bottom of the segment and ends at the search ending point, which may be the top of the segment or the search end point (CT), whereas in the CP segment searching begins at the CP to the top and then from the bottom of the segment to the search ending point, which may be the location immediately adjoining to the location of the CP, or the search end point (CT). More particularly, and with reference to FIG. 7, for the assumption that the segment does not contain CP, the search begins at the bottom of the segment and continues upward in the segment until either a winner (i.e. first location from starting point where a bit is set to a logical 1) is found, the top (last) entry of the segment is reached, or the search end point (CT) is reached. For the assumption that the segment contains CP, there are two individual searches. The first CP segment search begins at the bottom of the segment and continues upwardly in the segment until either a winner is found, the entry before the CP-segment is reached, or the search ending point (CT) is reached. The second CP segment search begins at the entry corresponding to CP-segment and continues upwardly in the segment until either a winner is found or the top entry of the segment is reached.

Detailing the two CP segment searches, additional assumptions have to be made, because, as was stated earlier, all bits of the search ending point (CT) are not passed onto the segment search. Therefore, there is insufficient data to determine whether or not this segment truly contains CT. Assumptions for CT have to be made because of this uncertainty. One assumption is that CT is in this segment, and another assumption is that CT is not in this segment. Therefore, for the CP segment searches, there are a total of four searches that are conducted.

The same assumptions related to CT that were made for the CP segment searches have to be made for the non-CP segment search. Therefore for the non-CP segment search, there are a total of two searches that are conducted, one for each assumption regarding whether or not CT is in this segment.

For each of these searches, there must be an indication that a winner has been found, and a winning location that is qualified by that indication. As a consequence, it should be noted that the output from each segment includes three pieces of information associated with what was found in each of the searches, each piece of information containing two search outputs relating to the CT assumption.

Figure 8A:
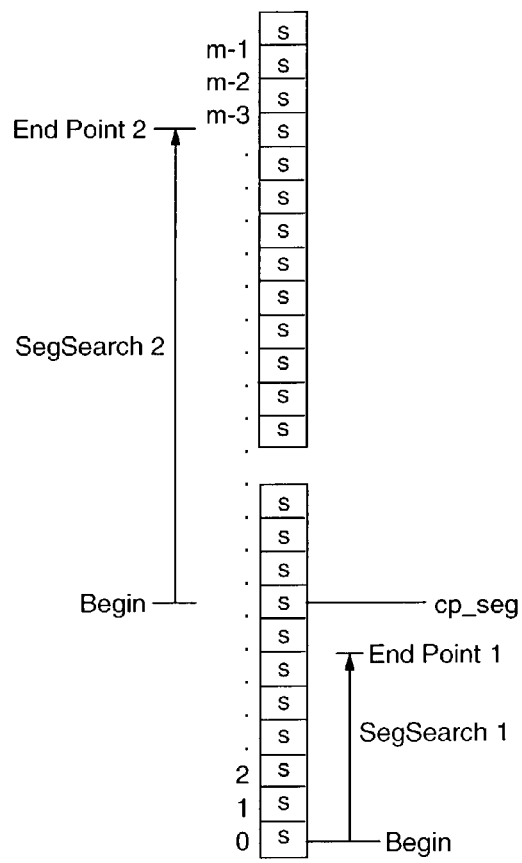
FIG. 8, consisting of FIGS. 8a and 8b, shows a graphical representation of searching segments based upon assumptions that a search starting point (CP) is in the segment and the search starting point (CP) is not in the segment. In each case CT (ending point) is shown.
Figure 8B:
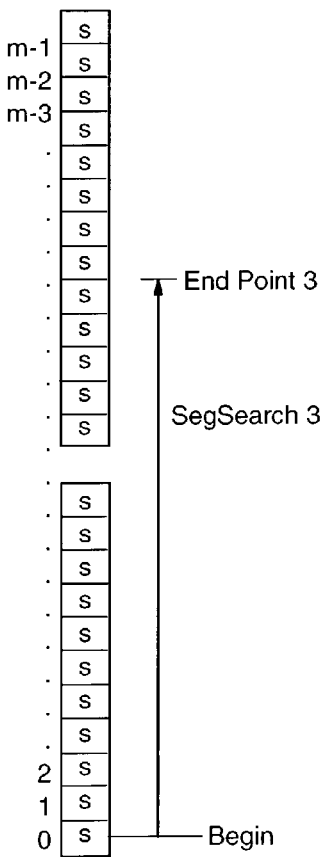

FIGS. 8a and 8b show more detailed graphical representation of the starting and end points of these three segment searches. As stated above, three different search routines are required for searching each segment. With this in mind, the searches are labeled in FIGS. 8a and 8b as SegSearch 1, SegSearch 2 and SegSearch 3. It should be noted that the numbering merely identifies the search that must be done, but does not imply that they should be done sequentially, i.e. SegSearch 1, then SegSearch 2, then SegSearch 3. The searching may be done in any order. The guiding factor is the assumptions that are being made. In FIG. 8a it is assumed that the starting point (CP) is in the segment, hence the starting point is labeled CP-seg. One of the searches in the segment begins at the CP and ends at End Point 2. This search is labeled SegSearch 2. In SegSearch 1 the search begins at the first location in the segment and ends at End Point 1. The begin and end of each of the segment searches are identified by begin and end, respectively.

In FIG. 8b it is assumed that the CP is not in the segment. With this assumption, the search (SegSearch3) begins at the first location 0 of the segment and ends at End Point 3.

Because this is a Time Based calendar, each of the three searches are bounded by end points CT. In order to account for CT, four assumptions are made and segment winners based on each assumption are generated.

FIG. 9 shows graphical representations of the assumptions and the relevant data for each one. Each of the searches, to be named below have a search end point. The value of the end point is different, depending on the value of ct_seg and what the assumption is regarding CT. Table 1 shows relevant data for assumption:

cp is in this segment, ct is in this segment—Because cp is in this segment, SegSearch1 (called cp_ct_SegSearch1) and SegSearch2 (called cp_ct_SegSearch2) are conducted. For the cp_ct_SegSearch1, the search end point is given by m-1 (largest segment location) or ct_seg, whichever is lower.

Table 2 shows relevant data for the assumption:

cp is in this segment, ct is not in this segment—Because cp is in this segment, SegSearch1 (called cp_nct_SegSearch1) and SegSearch2 (called cp_nct_SegSearch2) are conducted. For the cp_ct_SegSearch2, the search end point is given by ct_seg or cp_seg-1, whichever is lower. If the value of cp_seg is equal to zero, then the search end point is equal to zero.

Table 3 shows relevant data for the assumption:

cp is not in this segment, ct is in this segment—Because cp is not in this segment, SegSearch3 (called ncp_ct_SegSearch3) is conducted. For the ncp_ct_SegSearch3, the search end point is given by ct_seg.

Table 4 shows relevant data for the assumption:

cp is not in this segment, ct is not in this segment—Because cp is not in this segment, SegSearch3 (called ncp_nct_SegSearch3) is conducted. For the ncp_nct_Search3, the search end point is given by m-1 (largest segment location).

Turning to FIG. 8a for the moment, SegSearch1 is a cp segment search that begins at cp and ends at the top of the segment. There are two cpSegSearch1 searches that occur in parallel, as shown in Table 1 and Table 2 (FIG. 9). SegSearch2 is the cp_seg search that begins at the bottom of the segment and ends at the location that is one entry before cp_seg. As can be seen in Tables 1 and 2 (FIG. 9) there are two SegSearch2 searches that occur in parallel.

Referring to FIG. 8b for the moment, SegSearch3 is a non-cp SegSearch. As shown in Tables 3 and 4 (FIG. 9), there are two SegSearch3 searches that occur in parallel.

Figure 10:
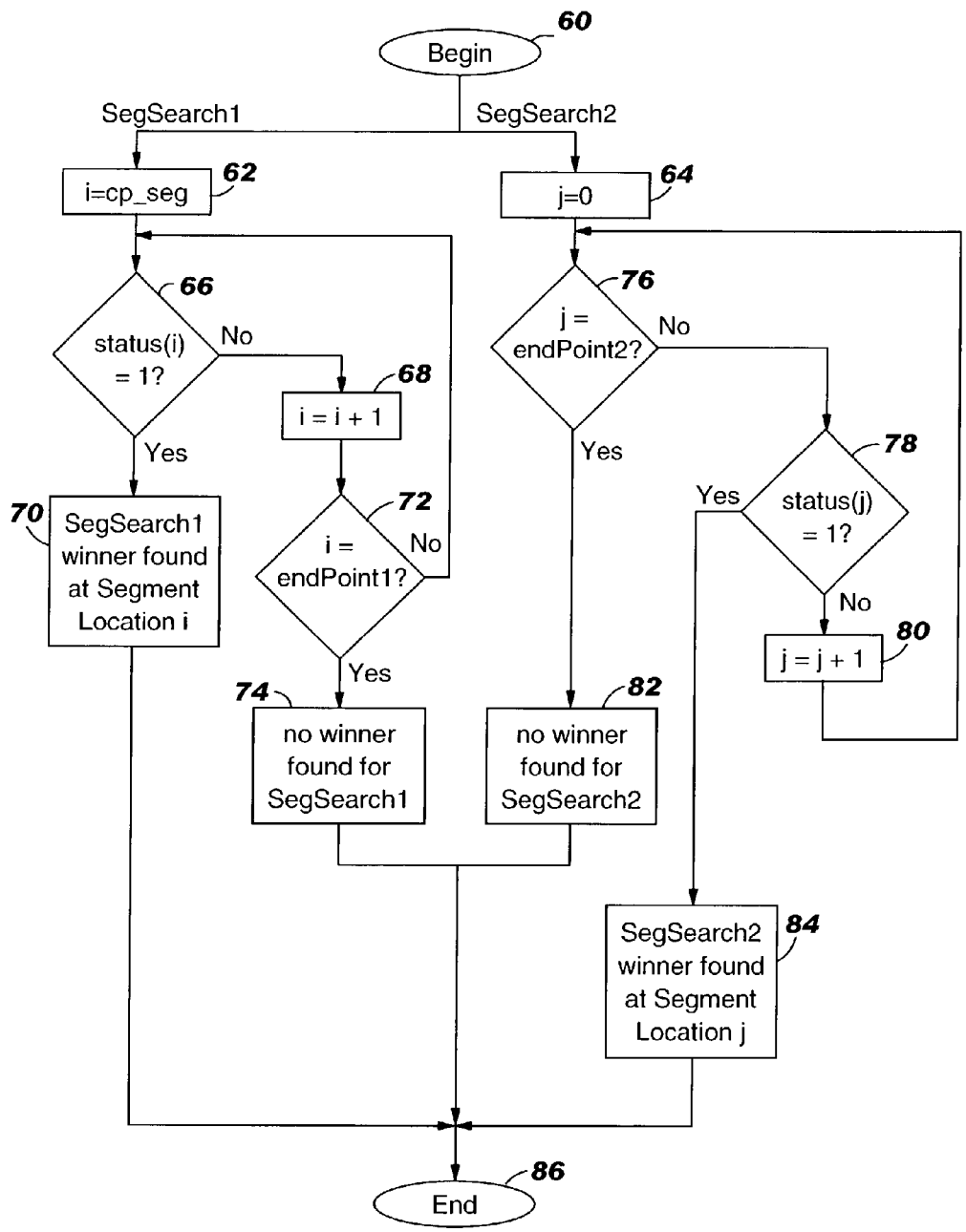
FIG. 10 is a flowchart for four segment searches, assuming CP is in the segment.

FIG. 10 shows a flowchart for SegSearch1 and SegSearch2. The search begins in step 60. It should be repeated that two identical SeciSearch1's are conducted in parallel (cp_ct_SegSearch1 and cp_nct_SegSearch1), each using the appropriate end point as shown in FIG. 9, Table 1(cp_ct_SegSearch1), and FIG. 9, Table 2 (cp_nct_SegSearch1).

It should also be repeated that there are two identical SegSearch2's being conducted in parallel (cp_ct_SegSearch2 and cp_nct_SegSearch2), each using the appropriate end point as shown in FIG. 9, Table 1 (cp_ct_SegSearch2) and FIG. 9, Table 2 (cp_nct_SegSearch2).

FIG. 10 describes the cpSegSearch1 and cpSegSearch2 searches, using an end point in the diagram.

This search diagram or flow chart can be used by someone skilled in the art to generate the logic for this portion of the search that goes into the search logic and algorithm 50, figure 5. Still referring to FIG. 10, the search begins in the block labeled 60 and ends in the block labeled 86. In particular, the algorithm begins in block 60 and goes into block 62 for SegSearch1. Beginning with SegSearch1, a counter used to represent the locations in the segment (i) is initialized to the value of cp for that segment, or cp_seg, in block 62. Block 66 is the decision block which checks for a Status value of 1 for the segment location corresponding to i. If the answer to block 66 is yes, then a SegSearch1 winner has been found at location i as indicated by block 70, and this SegSearch1 is complete. If the answer to block 66 is no, then i is incremented by a value of one in block 68, and this incremented value is compared to the endpoint in block 72. If the answer to block 72 is yes, then SegSearch1 is complete, with no winner found, as shown in block 74. If the answer to block 72 is no, then the decision block 66 checks the status value for the new calendar location. This repeating sequence of testing the calendar status bit in block 66 is repeated until either a winner is found (answer for decision block 66 is yes) or the search endpoint is reached without a winner (the answer for decision block 72 is yes.

Continuing with SegSearch2, a counter used to represent the locations in the segment (j) is initialized to a value of zero, which is the lowest (bottommost) calendar entry of the segment in block 64. Block 76 is the decision block which compares the value of j to the search end Point location. If the answer to block 76 is yes, then there is no winner found for SegSearch2, as indicated in block 82, and SegSearch2 is complete. If the answer to block 76 is no, then decision block 78 is entered. Block 76 checks for a Status value of I for the segment location corresponding to j. If the answer to block 78 is yes, then a SegSearch2 winner has been found at segment location j, as indicated in block 84, and SegSearch2 is complete. If the answer to block 78 is no, then the counter j is incremented by one to point to the next highest calendar location, as shown in block 80, and decision block 76 is reentered. The repeating sequence of comparing the value of j to the search endpoint location (decision block 76), followed by testing the calendar status bit in block 78 is repeated until either (1) the answer to block 76 is yes, indicating that no winner is found for the segment, or (2) the answer to block 78 is yes, indicating that a winner has been found at location j.

Figure 11:
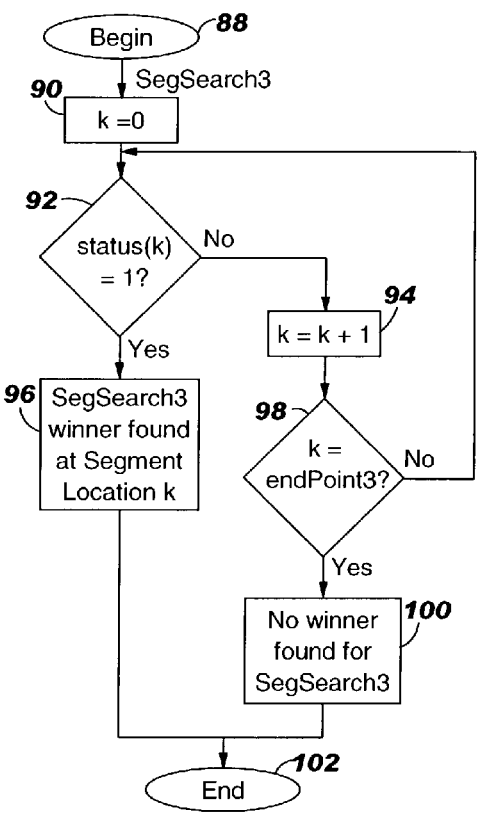
FIG. 11 is a flowchart for two segment searches, assuming CP is not in this segment.

FIG. 11 shows a flowchart for SegSearch3. For flowchart 11 it is assumed that cp is not in this segment and two segment searches are performed. The search begins in block 88. It should be repeated that two identical SegSearch3's are conducted in parallel (ncp_ct_SegSearch3 and ncp_nct_SegSearch3), each using the appropriate end point as shown in FIG. 9, Table 3 (ncp_ct_SegSearch1), and FIG. 9, Table 4 (ncp_nct_SegSearch1).

FIG. 11 describes the SegSearch3 search, using an end point in the diagram. The flow diagram can be used by someone skilled in the art to generate the logic that goes into block 50 (FIG. 5) to generate the logic. The search begins in block 88 and ends in block 102. In particular, the algorithm for SegSearch3 begins in block 88. SegSearch3 begins by initializing a counter used to represent the locations in the segment (k) to a value of zero, which is the lowest (bottommost) calendar entry of the segment in block 90. Block 92 is the decision block which checks for a Status value of I for the segment location corresponding to k. If the answer to block 92 is yes, then a SegSearch3 winner has been found at segment location k, as indicated in block 96, and SegSearch3 is complete. If the answer to block 92 is no, then k is incremented y a value of one, as shown in block 94, and decision block .98 is entered. Decision block 98 compares the value of k to the endpoint location. If the answer to block 98 is yes, then no winner for SegSearch3 has been found, as shown in block 100, and SegSearch3 is over. If the answer to block 98 is no, then decision block 92 is reentered. The repeating sequence of checking the calendar status bit (decision block 92), followed by comparing the value of k to the endpoint location (decision block 98) is repeated until either (1) the answer to block 92 is yes, indicating that a winner has been found at location k, or (2) the answer to block 98 is yes, indicating that no winner has been found for the segment.

Figure 12:
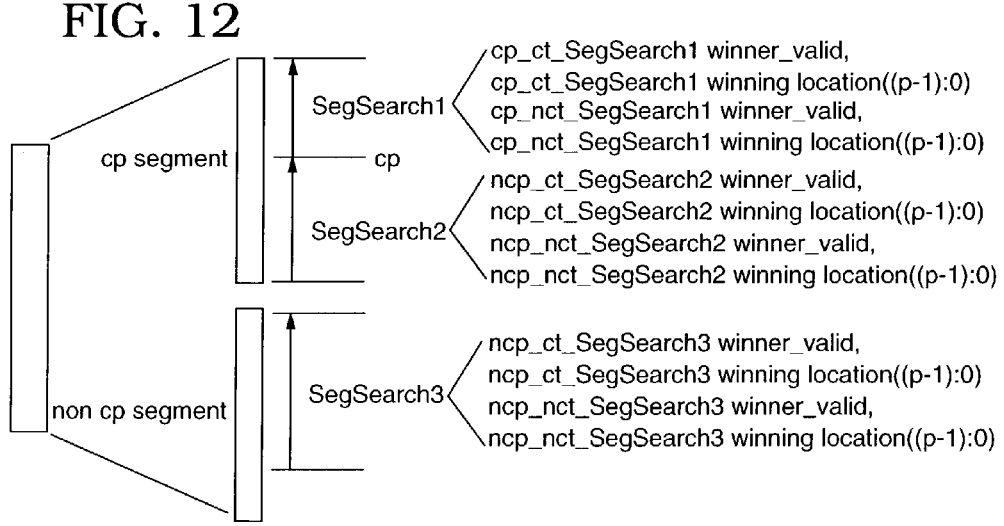
FIG. 12 is a graphical representation of outputs generated by each segment.

FIG. 12 shows a graphical representation of the outputs which are generated by each segment. As stated previously, the outputs are fed into storage elements and are used by the Top Search Engine to determine the final winner and location of the search. The Top Search is conducted in the second system clock cycle whereas the segment searches are conducted in parallel during the first system clock cycle. In FIG. 12 the searches are based upon the assumption that cp is in the segment. For that assumption four outputs A, B, C and D (each output has two elements—a winner valid and the location) are generated. For the assumption cp is not in the segment (non cp segment) ncpSegSearch3 with outputs E and F are provided. In summary, FIG. 12 shows the six outputs (A, B, C, D, E and F) that are generated by each segment.

Figure 13:
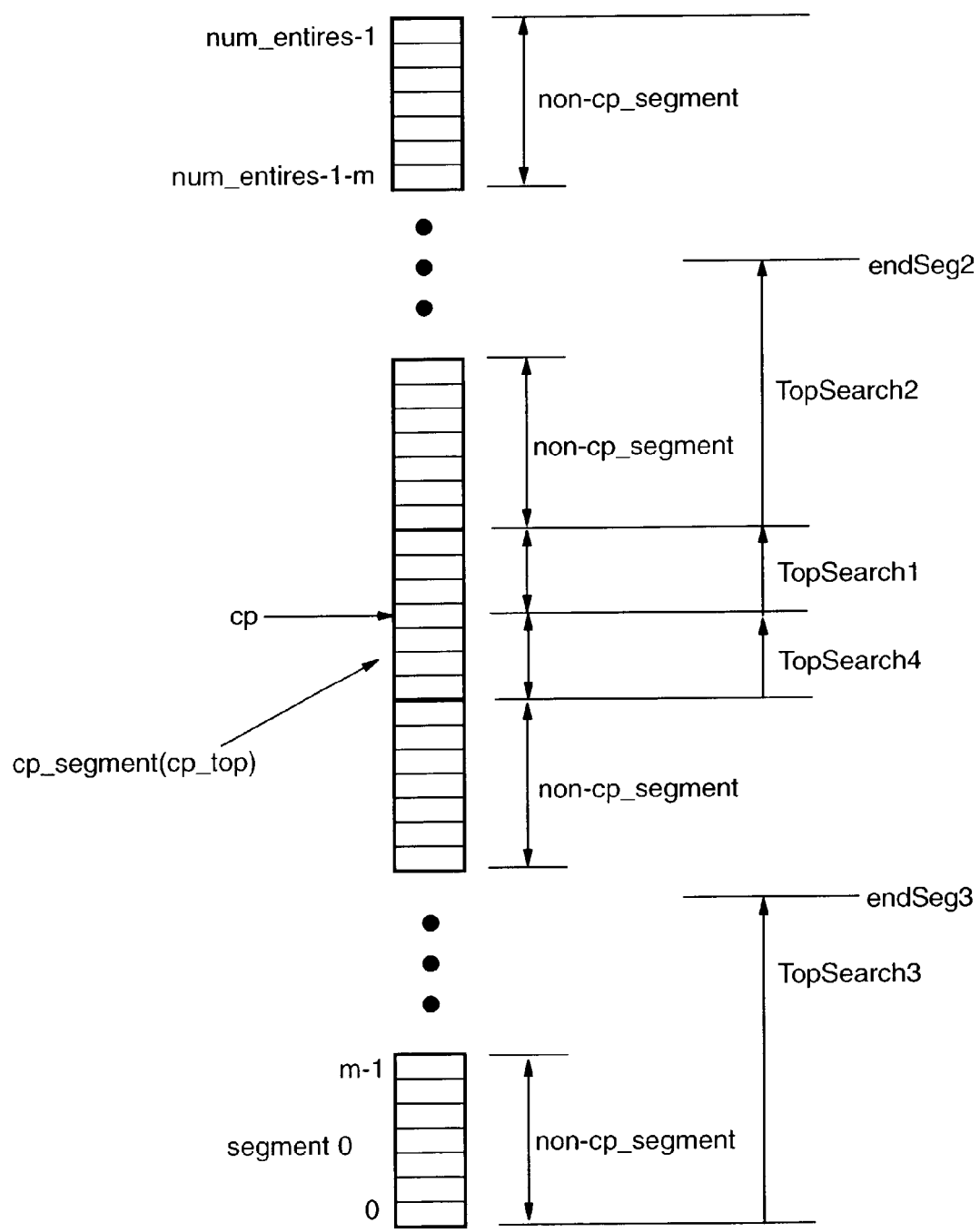
FIG. 13 is a graphical representation of the top segment search regions.

FIG. 13 shows a graphical representation of the Top Search. The Top Search has the cp segment and ct segment values as inputs. The outputs from each segment are also accessible by the Top Search. The Top Search begins in the segment that contains cp (cp_top). During TopSearch1, the Top Search algorithm (described herein) considers the SegSearch1 results for the segment containing cp. If a winner was found for this search, then this segment location forms the least significant bits of the winner. The segment containing cp (cp_top) forms the most significant bits of the Winner, and the overall search is complete. A flowchart for this SegSearch1 is set forth herein.

Still referring to FIG. 13, if no TopSearch1 Winner is found, TopSearch2 is conducted, provided that the proper conditions are met. During TopSearch2, the Top Search algorithm considers the ncpSegSearch3 results for the segments, beginning with the segment above cp, and continues, upward until either a winning segment is found, or the end segment is reached. For TopSearch2 the end segment is the lower of the following two values: (a) ct_seg or (b) n-1 where n is the top most segment. If a segment winner is found, then the segment containing the winner forms the most significant bit(s) of the overall winner, the SegSearch3 winning location forms the least significant bit(s) of the overall winner, and the overall search is complete.

Figure 14:
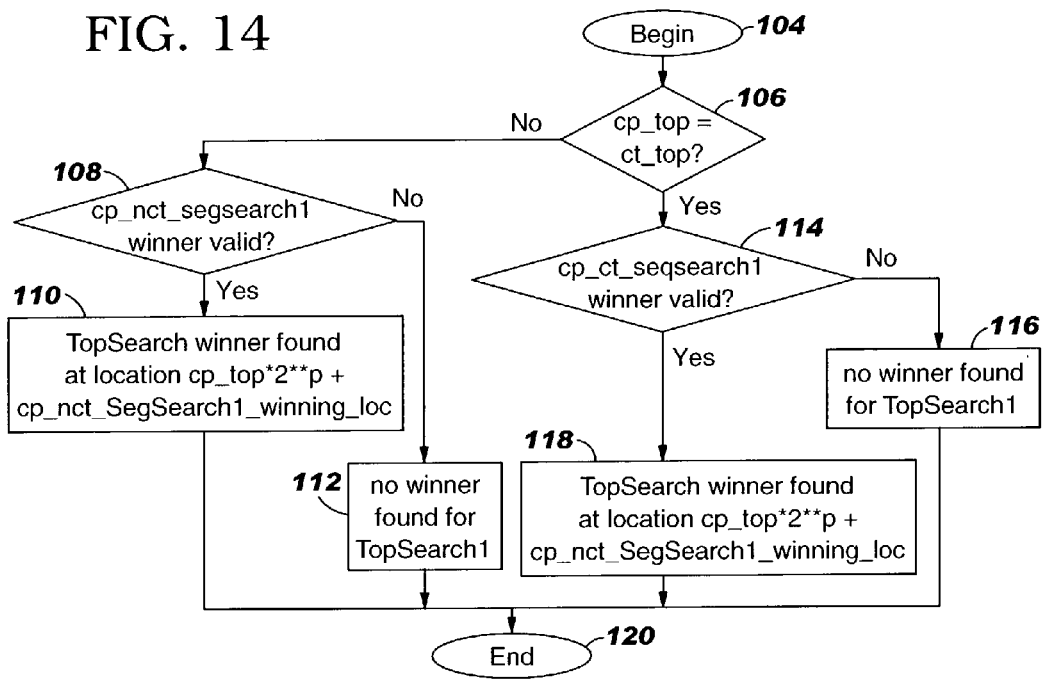
FIG. 14 is a flowchart for Top Search 1 algorithm.

If no TopSearch3 winner is found, and the proper conditions are met, then TopSearch3 is conducted. During TopSearch3, the Top Search algorithm considers the ncpSegSearch3 results for the segments, beginning with the bottom segment, and continues upward until either a winning segment is found or the end segment is reached. For TopSearch3, the end segment is the lower of the following two values: (a) ct_seg or (b) cp_seg-1, where this value cannot be negative. If a segment winner is found, then the segment containing the winner forms the most significant bit(s) of the overall winner, the SegSearch3 winning location forms the least significant bit(s) of the overall winner, and the overall search is complete. If no TopSearch3 winner is found, TopSearch4 is conducted. During TopSearch4, the Top Search algorithm considers the cpSegSearch2 results for segment cp_top. FIG. 14 shows a flow diagram of TopSearch4. If a winner is found, then the segment containing cp forms the most significant bits of the winner and the cpSegSearch2 winning location forms the least significant bits of the winner.

TopSearch2 is conducted provided that no TopSearch winner was found. During TopSearch1, the TopSearch algorithm considers the cpSegSearch1 results for segment cp_top. A flowchart showing the algorithm for TopSearch1 is provided hereinafter. If cp_top equals ct_top, then the cp_ct_SegSearch1 winner is considered. If cp_top is not equal to ct_top, then the cp_nct_SegSearch1 winner is considered. If a winner was found for cpSegSearch2, then this segment location forms the least significant bits of the overall winner, the segment containing CP (cp_top) forms the most significant bits of the overall winner, a TopSearch1 winner has been found, and the overall search is complete. If no TopSearch1 winner is found, then the search continues with TopSearch2.

During TopSearch2, the Top Search algorithm considers the ncpSegSearch3 results for the segments, beginning with the segment above cp, and continues, upward until either a winning segment is found or the end segment is reached. For Table 2 the end segment is the lower of the following two values: a.) ct_seg or b.) n-1. If a segment winner is found, then segment containing the winner forms the most significant bits of the overall winner, the SegSearch winning location forms the least significant bits of the overall winner and the overall search is complete.

Still referring to FIG. 8, if no TopSearch2 winner is found, and the proper conditions are met, then TopSearch3 is conducted. During TopSearch3, the Top Search algorithm considers the SegSearch3 results for the segments, beginning with the bottom segment, and continues upward until either a winning segment is found, or the end segment is reached. For TopSearch3, the end segment is the lower of the following two values: a.) ct_seg or b.) cp_seg1, where this value cannot be negative. If SegSearch3 winner is found, then the segment containing the winner forms the most significant bits of the overall winner, the SegSearch3 winning location forms the least significant bits of the overall winner, and the overall search is complete. If no TopSearch3 winner is found, TopSearch4 is conducted. During TopSearch4, the TopSearch algorithm considers the SegSearch2 results for segment cp_top. A flowchart showing the algorithm for TopSearch4 is provided hereinafter. If cp_top equals ct_top, then the cp_ct_segSearch2 winner is considered. If cp_top is not equal to ct_top, then the cp_nct_segSearch2 winner is considered. If a winner was found for SegSearch2, then this segment location forms the least significant bits of the overall winner, the segment containing CP (cp_top) forms the most significant bits of the overall winner, and the overall search is complete. If no TopSearch4 winner is found, then the overall search is complete and no winner found.

FIG. 14 shows a flowchart of the search algorithm for TopSearch1. The search begins in block 104. This algorithm can be used by one skilled in the art to build the logic that goes into the Top Search Engine and the search logic 50 to do the Top Search. The algorithm begins in block 104 and ends in block 120. Decision block 106, which checks if the values of cp_top and ct_top are equivalent, is entered. If the answer to block 106 is yes, then decision block 114, which checks for a cp_ct_SegSearch1 winner for cp_seg, is entered. If the answer to block 114 is yes, then a TopSearch1 winner (and an overall winner) has been found. The segment winning location, as indicated by the cp_ct_SegSearch1 winning location, forms the least significant bits of the overall winning location. The value of cp_seg forms the most significant bits of the winning location. The formula for the winning location is given in block 118. If the answer to block 114 is no, then no winner was found for TopSearch1, as indicated in block 116.

If the answer to decision block 106, which checks if the values of cp_top and ct_top are equivalent, is no, then decision block 108, which checks for a cp_nct_SegSearch1 winner for cp_seg, is entered. If the answer to block 108 is yes, then a TopSearch1 winner (and an overall winner) has been found. The segment winning location, as indicated by the cp_nct_SegSearch1 winning location, forms the least significant bits of the overall winning location. The value of cp_seg forms the most significant bits of the winning location. The formula for the winning location is given in block 110. If the answer to block 108 is no, then no winner was found for topSearch1, as indicated in block 112.

Figure 15:
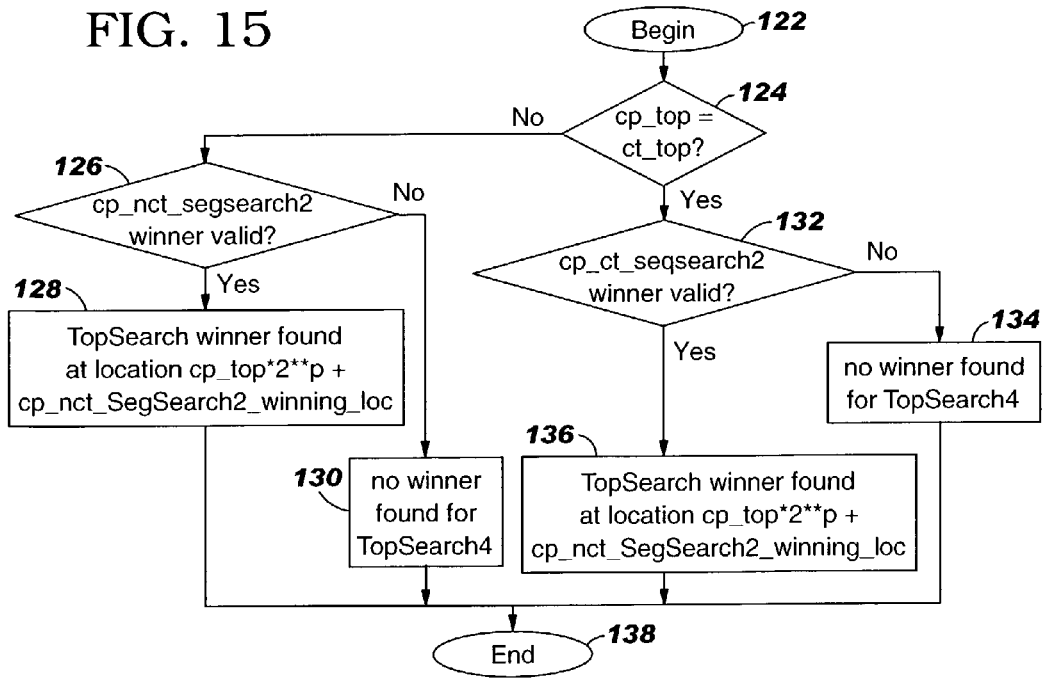
FIG. 15 is a flowchart for Top Search 4 algorithm.

FIG. 15 shows a flowchart for TopSearch4. The search begins in block 122 and ends in block 138. This algorithm can be used by one skilled in the art to build the logic that goes into the Top Search Engine and the search logic 50 to do the Top Search. The algorithm begins in block 122 and ends in block 138. Decision block 124, which checks if the values of cp_top and ct_top are equivalent, is entered. If the answer to block 124 is yes, then decision block 132, which checks for a cp_ct_SegSearch2 winner for cp_seg, is entered. If the answer to block 132 is yes, then a TopSearch4 winner (and an overall winner) has been found. The segment winning location, as indicated by the cp_ct_SegSearch2 winning location, forms the least significant bits of the overall winning location. The value of cp_seg forms the most significant bits of the winning location. The formula for the winning location is given in block 136. If the answer to block 132 is no, then no winner was found for TopSearch4, as indicated in block 134.

If the answer to decision block 124, which checks if the values of cp_top and ct_top are equivalent, is no, then decision block 126, which checks for a cp_nct_SegSearch2 winner for cp_seg, is entered. If the answer to block 126 is yes, then a TopSearch4 winner (and an overall winner) has been found. The segment winning location, as indicated by the cp_nct_SegSearch2 winning location, forms the least significant bits of the overall winning location. The value of cp_seg forms the most significant bits of the winning location. The formula for the winning location is given in block 128. If the answer to block 126 is no, then no winner was found for TopSearch4, as indicated in block 138.

Figure 16A:
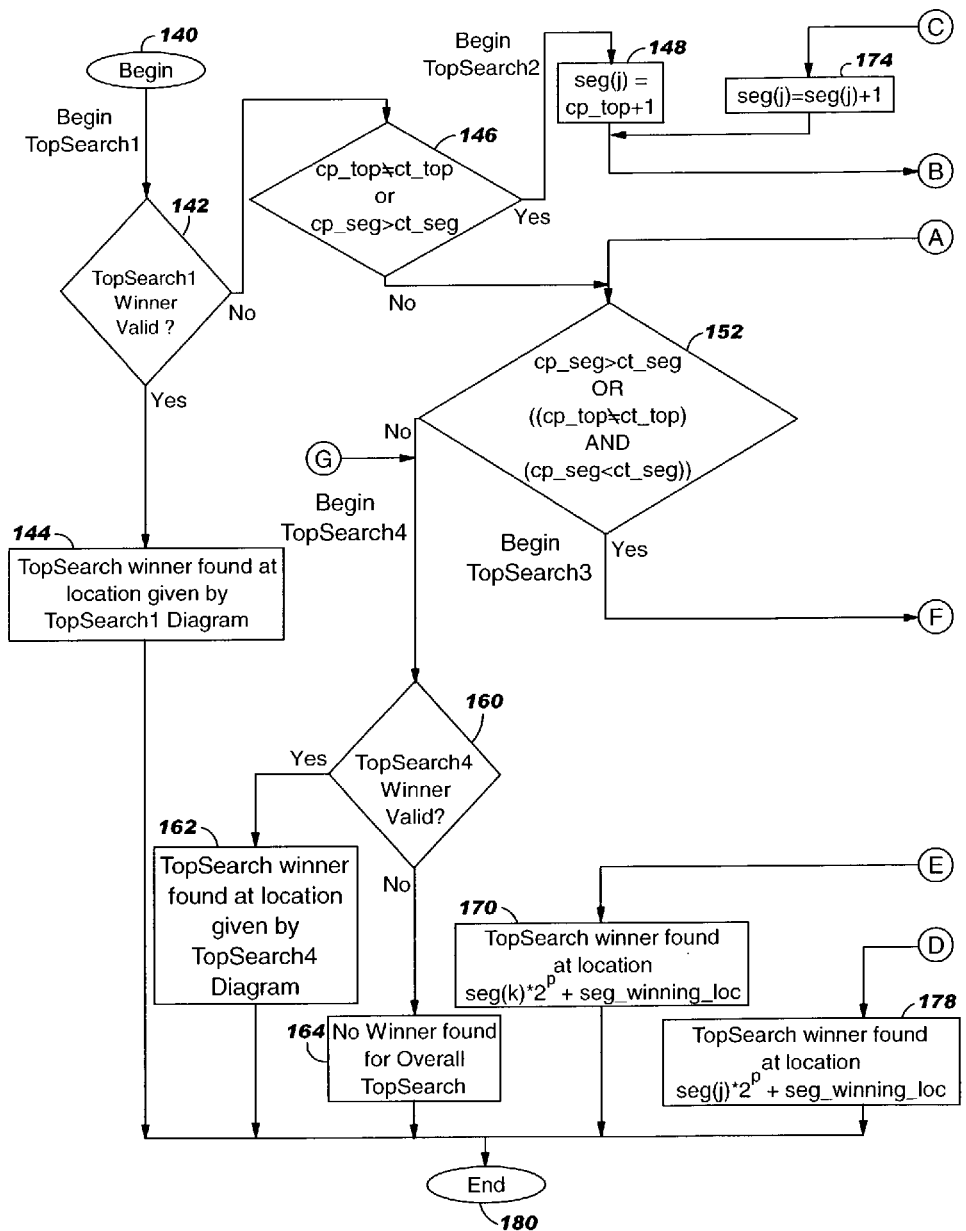
FIGS. 16A, 16B and 16C are flowcharts for Top Search Flow algorithm.
Figure 16B:
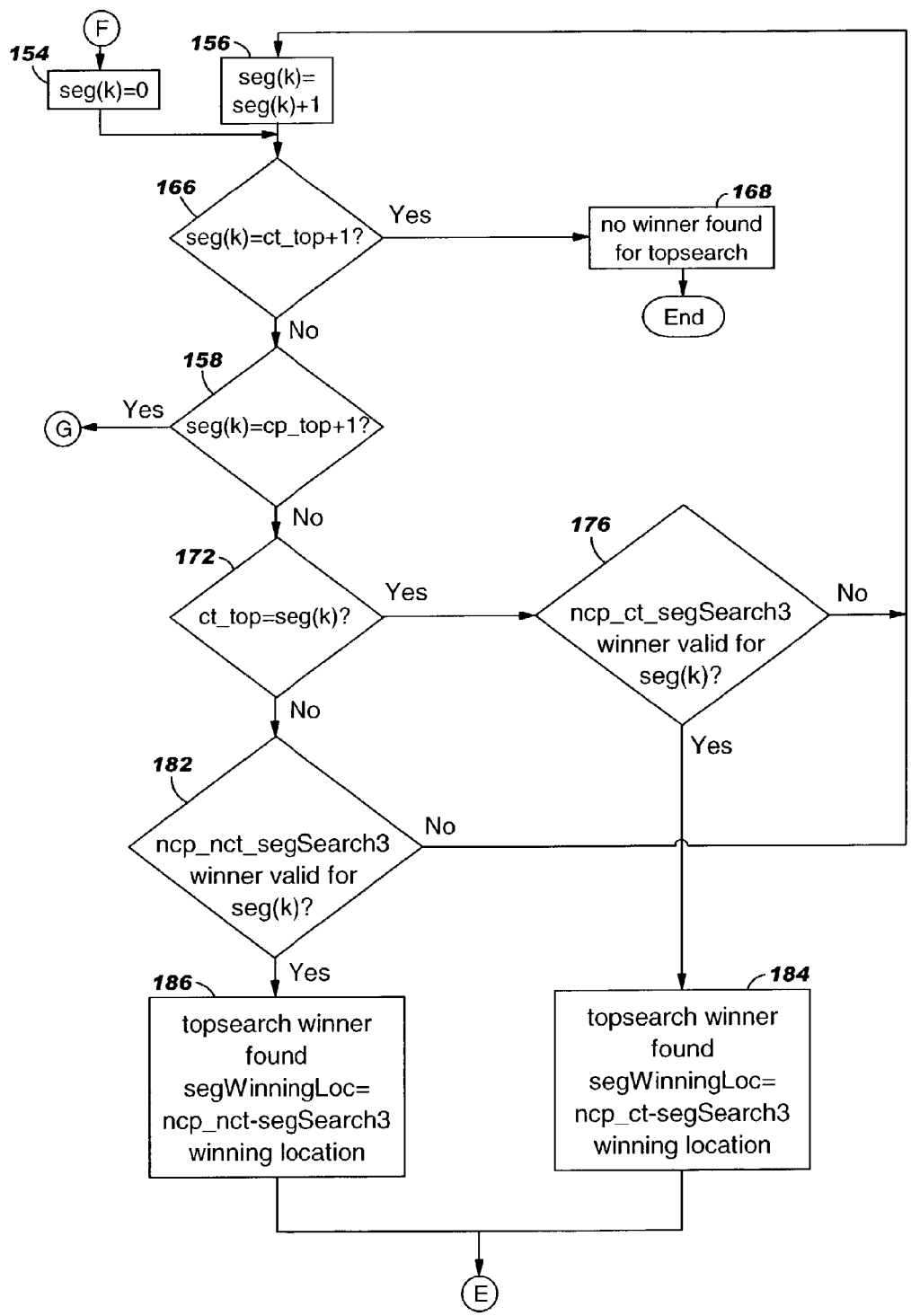
Figure 16C:
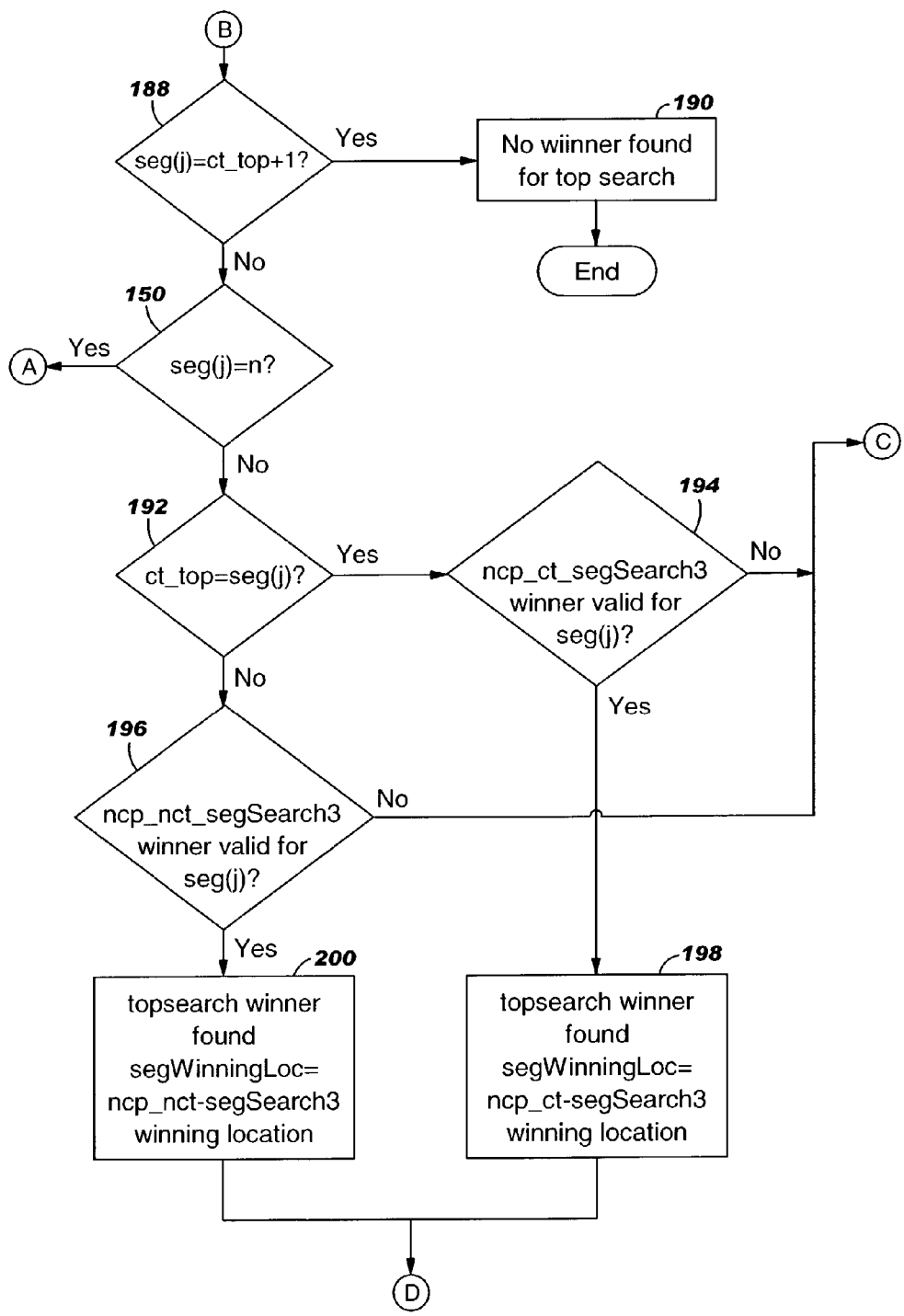

FIG. 16. consisting of FIG. 16A, FIG. 16B, and FIG. 160, shows a flowchart of the TopSearch algorithm. This algorithm can be used by one skilled in the art to build the logic that goes into the Top Search Engine and the search logic 50 to do the Top Search. The algorithm begins in block 140 (FIG. 16A) and ends in block 180. Decision block 142, which asks if a TopSearch1 winner was found, is entered. If the answer to block 142 is yes, then block 144 is entered, which states that the overall winner, as indicated during the TopSearch1 description, is the TopSearch1 output location, and the search is complete by entering block 180. If the answer to block 142 is no, then decision block 146 is entered. Decision block 146 determines whether or not to conduct TopSearch2. If (1) cp_top is not equal to ct_top, and (2) cp_seg (least significant bits of cp) is greater than ct_seg (least significant bits of ct), then TopSearch2 is conducted. If the answer to decision block 146 is yes, then block 148, which initializes a counter, seg(j) to a value of cp_top+1, is entered. If the answer to decision block 146 is no, then Decision block 152, which is described in detail below, is entered.

After leaving block 148, decision block 188 (FIG. 16C), which asks if seg(j) is equal to the value of ct_top+1, is entered. If the answer to block 188 is yes, then block 190 is entered. Block 190 indicates that no winner was found for the top search, and the ending block, block 180, is entered. If the answer to block 188 is no, then decision block 150 is entered. Decision block 150 asks if the values of (a) seg(j) and (b) n (the number of segments), are equal. If the answer to block 150 is no, then decision block 192, which asks if the values of ct_top and seg(j) are equal, is entered. Decision block 192 checks if the current segment is equal to the segment that contains ct. If the answer to block 192 is yes, then decision block 194, which asks if a ncp_ct_SegSearch3 winner is valid for seg(j). If the answer to block 194 is no, then block 174 (FIG. 16A), which increments the value of seg(j) by one, is entered. After leaving block 174, block 188 is re-entered. The sequence of (a) entering block 188, (b) going to decision block 150, (c) going to block 192, (d) going to block 194, and (e) going to block 174 continues until either (a) the segment above ct_top is reached, (b) the topmost segment is reached, (c) the segment containing ct (ct_top) is reached, or (d) a ncp_ct_segSearch winner is valid for the current segment. If the answer to block 194 is yes, then block 198, which indicates that a top search winner (and an overall winner) has been found, is entered. Block 198 also defines the value of the segment winning location (segWinningLoc) to be the ncp_ct_SegSearch3 winning location for segment seg(j). Block 178 (FIG. 16A), which will be discussed later, is then entered. If the answer to block 192 is no, then decision block 196, which asks if an ncp_nct_SegSearch3 winner is valid for seg(j), is entered.

If the answer to block 196 is no, then block 174 (FIG. 16A), which increments the value of seg(j) by one, is entered. After leaving block 174, block 188 is re-entered. The sequence of (a) entering block 188, (b) going to decision block 150, (c) going to block 192, (d) going to block 196, and (e) going to block 174 continues until either (a) the segment above ct is reached, (b) the topmost segment is reached, (c) the segment containing ct (ct_seg) is reached, or (d) a ncp_nct_segSearch winner is valid for the current segment. If the answer to block 196 is yes, then block 200 is entered. Block 200 indicates that a top search winner (and an overall winner) has been found. Block 200 also defines the value of the segment winning location (segWinningLoc) to be the ncp_nct_SegSearch3 winning location for segment seg(j). Block 178 (FIG. 16A), which will be discussed later, is then entered.

The segment winning location, referred to in block 178, forms the least significant bits of the overall winning location. The value of seg(j) forms the most significant bits of the winning location. The formula for the winning location is given in block 178. After exiting block 178, the search is complete by entering block 180.

If the answer to decision block 150 is yes, then decision block 152 (FIG. 16A) is entered. Decision block 152 determines whether or not to conduct TopSearch3. If (1) cp_seg is greater than ct_seg or (2) both cp_top is not equal to ct_top and cp_seg is less than ct_seg, then TopSearch3 is conducted. If the answer to decision block 152 is yes, then block 154 (FIG. 16B), which initializes a counter, seg(k) to a value of zero, is entered. Next, decision block 166, which asks if the value of seg(k) is equal to the value of ct_top+1, is entered. If the answer to block 166 is yes, then block 168, which indicates that no TopSearch4 winner has been found, is entered. If the answer to block 166 is no, then decision block 158, which asks if the value of seg(k) is equal to that of cp_top, is entered. Decision block 158 is also one of the TopSearch4 entry criterion. If the answer to block 158 is yes, then decision block 160 (FIG. 16A), which asks if a TopSearch4 winner was found from the decision in FIG. 15, is entered. If the answer to block 160 is yes, then block 162 is entered. Block 162 states, as indicated in the TopSearch4 description, that the overall winner is the TopSearch4 output location. Next, the search is complete by entering block 180. If the answer to block 160 is no, then block 164, which indicates that no winner was found for the Top Search is entered, and the search is complete by entering block 180. If the answer to block 152 is no, then decision block 160 is entered. Decision block 152 having an answer of no is another TopSearch4 entry criterion. TopSearch4 begins when block 160 is entered.

If the answer to block 158 (FIG. 16B) is no, then decision block 172, which asks if the values of ct_top and seg(k) are equal, is entered. Decision block 172 checks if the current segment is equal to the segment that contains ct. If the answer to block 172 is yes, then decision block 176, which asks if a ncp_ct_SegSearch3 winner is valid for seg(k) is entered. If the answer to block 176 is no, then block 156, which increments the value of seg(k) by one, is entered. After leaving block 156, block 166 is re-entered. The sequence of (a) entering block 166, (b) going to decision block 158, (c) going to block 172, and (d) going to block 176 continues until either (a) the segment above cp_top is reached, (b) the topmost segment is reached, (c) the segment containing ct (ct_seg) is reached, or (d) a ncp_ct_segSearch winner is valid for the current segment. If the answer to block 176 is yes, then block 184, which indicates that a top search winner (and an overall winner) has been found, is entered. Block 184 also defines the value of the segment winning location (segWinningLoc) to be the cp_nct_SegSearch3 winning location for segment seg(k). Block 170 (FIG. 16A), which will be discussed later, is then entered. If the answer to block 172 is no, then block 182, which asks if an ncp_nct_SegSearch3 winner is valid for seg(k), is entered.

If the answer to block 182 is no, then block 156, which increments the value of seg(k) by one, is entered. After leaving block 156, block 166 is re-entered. The sequence of (a) entering block 166, (b) going to decision block 158, (c) going to block 172, (d) going to block 182, and (e) going to block 156 continues until either (a) the segment above ct_seg is reached, (b) the segment containing cp (cp_seg) is reached, (c) the segment containing ct (ct_seg) is reached, or (d) a ncp_nct_segSearch winner is valid for the current segment. If the answer to block 182 is yes, then block 186 is entered. Block 186 indicates that a top search winner (and an overall winner) has been found. Block 186 also defines the value of the segment winning location (segWinningLoc) to be the ncp_nct_SegSearch3 winning location for segment seg(j). Block 170 (FIG. 16A), which will be discussed later, is then entered.

The segment winning location referred to in block 170 forms the least significant bits of the overall winning location. The value of seg(k) forms the most significant bits of the winning location. The formula for the winning location is given in block 170. After exiting block 170, the search is complete by entering block 180.

Even though illustrative embodiments of the present invention have been described here with references to the accompanying drawings, it is to be understood that the invention is not limited to those precise embodiments and that various other changes and modifications may be affected therein by one skilled in the art without departing from the scope or spirit of the invention.

The invention claimed is:

1. A search method implemented by a computer or like machine comprising:
   a) partitioning a search region into n segments, where n is greater than 0;
   b) identifying for each segment a first location whereat searching begins and a second location whereat search ends;
   c) searching each segment with a first predetermined algorithm beginning at the first location and ending at the second location;

d) for each segment, generating from said searching information indicating whether or not any indicator bit set to a predetermined state has been detected and the location of the indicator bit; and e) using the information provided in d) to select a winning location.

2. The search method of claim 1 further including the step of performing a predetermined action on an entity associated with the winning location.

3. A search method implemented by a computer or like machine comprising:

a) partitioning a search region into n segments, where n is greater than 0;

b) identifying for each segment a first location whereat searching begins and a second location whereat search ends;

c) searching each segment with a first predetermined algorithm beginning at the first location and ending at the second location;

d) for each segment, generating from said searching information indicating whether or not any indicator bit set to a predetermined state has been detected and the location of the indicator bit; and e) using the information provided in d) to select a winning location;

f) performing a predetermined action on an entity associated with the winning location;

g) providing a pointer to identify the location whereat searching starts;

h) stepping the pointer sequentially to access a plurality of locations within the region;

i) testing indicator bit at each location to see if it is set in the predetermined state; and j) generating a control signal for the first location encountered with the indicator bit set to the predetermined state.

4. The method of claim 1 wherein the search region includes a plurality of contiguous locations to which information can be written or deleted and an indicator whose setting indicates information present or no information present at a selected location.

5. The method of claim 4 wherein the information includes an identification number for at least one flow queue.

6. The method of claim 1 wherein the searches on the n segments are executed simultaneously.

7. A search method implemented by a computer or like machine comprising:

a) partitioning a search region into n segments, wherein n is greater than 0 and searches on the n segments are executed simultaneously;

b) identifying for each segment a first location whereat searching begins and a second location whereat search ends;

c) searching each segment with a first predetermined algorithm beginning at the first location and ending at the second location;

d) for each segment, generating from said searching information indicating whether or not any indicator bit set to a predetermined state has been detected and the location of the indicator bit; and e) using the information provided in d) to select a winning location; wherein for step b) first it is assumed no current painter (CP) is in a segment being searched wherein searching begins at a first location of the segment and ends at a first predetermined location within said segment; and second it is assumed a current pointer (CP) is in the segment being searched wherein searching begins at the CP location in said segment being searched ending at a second predetermined location of the segment and searching begins at the first location in the segment ending at a third predetermined location.

8. A method implemented by a computer or like machine to determine the next packet to forward from one of a plurality of flow queues comprising:

a) providing in a memory a search region including a plurality of contiguous locations to which information can be written/deleted and an indicator whose state indicates the present or absent of information at a selected location;

b) partitioning said search region into n segments, wherein n is greater than 0;

c) identifying a first location whereat searching begins for each segment;

c1) Identifying a second location whereat searching ends for each segment;

d) searching each segment in accordance with a first predetermined algorithm;

e) generating from each segment information indicating whether or not any indicator set to a predetermined state has been detected in said segment and location of detection;

f) determining the segment in which the first location is located;

f1) determining the segment in which the second location is located; and g) examining the information in (e), (f1) and (f) with a second predetermined algorithm to select a winner indicator and location.

9. The method in claim 8 further including using the information to move a packet from a queue associated with the location in step g).

10. An apparatus including:

n traffic flow Queues, wherein n is greater than 0;

a processing complex including at least one processor that enqueues packets on selected ones of the traffic flow queues;

a memory with a search zone having a plurality of search locations with each search location including at least one indicator;

p segment search engines, p is greater than 1, and each of said p segment search engine includes m inputs wherein each one of the m inputs operatively coupled to an indicator within a group of indicators, a first control input indicating a location whereat the segment search engine begins to search and a second control input indicating a location whereat the search ends; and a top search engine responsive to signals provided by the p segment search engines to generate a control signal identifying a location within said search zone.

11. An apparatus including:

n traffic flow Queues, wherein n is greater than 0;

a processing complex including at least one processor that enqueues packets on selected ones of the traffic flow queues;

a memory with a search zone having a plurality of search locations with each search location including at least one indicator;

p segment search engines, p is greater than 1, and each of said p segment search engine includes m inputs wherein each one of the m inputs operatively coupled to an indicator within a group of indicators, a first control input indicating a location whereat the segment search engine begins to search and a second control input indicating a location whereat the search ends;

a top search engine responsive to signals provided by the p segment search engines to generate a control signal identifying a location within said search zone;

a first scheduler function that monitors the traffic flow queues and periodically attaches to a location in said search zone a characteristics of a traffic flow queue if a packet is placed in said traffic flow queue; and a second scheduler function responsive to the control signal to transmit a packet from a selected Flow Queue.

12. The apparatus of claim 11 further including a plurality of target port Queues wherein one of said target port queues received the transmitted packet.

13. The apparatus of claim 11 wherein the characteristics includes the flow queue identification number.

14. A device for use in communication system to detect a location from which a frame is to be transmitted comprising:

p segment search engines, p greater than 1 and each segment search engine having m inputs, m greater than 1, wherein each of the m inputs representing an output from a calendar location status bit, a first control input indicating a location whereat a search of the m inputs begins and a second control input indicating a location whereat the search ends;

at least one storage location that stores information outputted from each of the p segment search engines wherein the information relates to state of status bits; and a top search engine responsive to information stored in said one storage location to select and identify one of the locations as a winning location in said calendar wherein the o segment search engines operate simultaneously during a first machine cycle to generate output information and the top search engine operates alone on the output information during a second machine cycle to select and identify said one of the locations.

15. A search method executed by computer or like machine comprising:

a) partitioning a search region into n segments, wherein n is greater than 0 and each segment includes m entries, wherein m is an even power of 2;

b) identifying for each segment a first location whereat searching begins and a second location whereat search ends;

c) searching each segment with a first predetermined algorithm beginning at the first location and ending at the second location;

d) for each segment, generating from said searching information indicating whether or not any indicator bit set to a predetermined state has been detected and the location of the indicator bit; and e) using the information provided in d) to select a winning location.

16. The method of claim 1 or 15 wherein step d) further includes the step of correlating outputs from each segment search with a top search algorithm to select the winning location.

17. A computer generated method for controlling the flow of information packets within a communications device including:

(a) providing a multi-position calendar;

(b) partitioning the calendar into n segments, wherein n is greater than 0;

(b1) for each segment identifying a first location whereat searching begins and a second location whereat searching ends;

(c) searching each segment with a segment search algorithm to identify at least one location with an indicator set to a first state;

(d) examining with a top search algorithm locations detected (b); and (e) selecting one of the locations as a winning location.

18. A computer generated method for controlling the flow of information packets within a communications device including:

(a) providing a multi-position calendar;

(b) partitioning the calendar into n segments, wherein n is greater than 0;

(b1) for each segment identifying a first location whereat searching begins and a second location whereat searching ends;

(c) searching each segment with a segment search algorithm to identify at least one location with an indicator set to a first state;

(d) examining with a top search algorithm locations detected (b);

(e) selecting one of the locations as a winning location;

(f) determining a final winning location by concatenating an identification number for a winner segment containing the winning location to a value for the winning location within said winner segment; and (g) forwarding a packet from a flow queue having an identification number matching an identification number stored at the final winning location.

19. A program product including:

a medium on which a computer program is recorded, said computer program including:

(a) a set of instructions that partition locations on a calendar into n segments, n is greater than 0;

(a1) a set of instructions that identify a first location in each segment whereat searching begins and a second location whereat searching ends;

(b) a set of instructions that search each segment with a segment search algorithm to identify at least one location with an indicator set to a first state;

(c) a set of instructions that examine with a top search algorithm locations identified in (b); and (d) a set of instructions that selects one of the locations as a winning location.

20. A program product including:

a medium on which a computer program is recorded, said computer program including:

(a) a set of instructions that partition a calendar into n segments, n is greater than 0;

(a1) a set of instructions that identify a first location in each segment whereat searching begins and a second location whereat searching ends;

(b) a set of instructions that search each segment with a segment search algorithm to identify at least one location with an indicator set to a first state;

(c) a set of instructions that examine with a tap search algorithm locations identified in (b);

(d) a set of instructions that selects one of the locations as a winning location;

(e) a set of instructions that determines a final winning location by concatenating an identification number for a winner segment containing the winning location to a value for the winning location within said winner segment; and (f) a set of instructions to generate and Issue a signal that causes a device to forward a packet from a flow queue having an identification number matching an identification number stored at the final winning location.

* * * * *